(12) United States Patent
Keating

(10) Patent No.: US 10,692,195 B2
(45) Date of Patent: Jun. 23, 2020

(54) COLOUR CONVERSION

(71) Applicant: Sony Corporation, Tokyo (JP)

(72) Inventor: Stephen Mark Keating, Reading (GB)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 15/924,455

(22) Filed: Mar. 19, 2018

(65) Prior Publication Data

US 2018/0300862 A1    Oct. 18, 2018

(30) Foreign Application Priority Data

Apr. 13, 2017   (GB) ................... 1706005.4

(51) Int. Cl.
*G06K 9/00* (2006.01)
*G06T 5/00* (2006.01)
*H04N 1/60* (2006.01)

(52) U.S. Cl.
CPC ........... *G06T 5/009* (2013.01); *H04N 1/6058* (2013.01); *H04N 1/6075* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 2008/0088858 A1* | 4/2008 | Marcu | .................... | H04N 1/407 358/1.6 |
| 2009/0021809 A1* | 1/2009 | Ramanath | .............. | H04N 9/643 358/520 |
| 2010/0085487 A1* | 4/2010 | Sarkar | .................. | H04N 1/6005 348/649 |
| 2012/0200589 A1* | 8/2012 | Min | ..................... | H04N 1/6008 345/591 |
| 2013/0021528 A1 | 1/2013 | Liu | | |
| 2013/0201363 A1 | 8/2013 | Sun | | |

* cited by examiner

*Primary Examiner* — Hadi Akhavannik
(74) *Attorney, Agent, or Firm* — Oblon, McClelland, Maier & Neustadt, L.L.P.

(57) ABSTRACT

Colour conversion apparatus comprises mapping circuitry configured to map pixels of an input image having colour components in an input colour space to pixels of an mapped image having colour components in an output colour space, the input colour space and the output colour space being different colour spaces such that at least a subset of colours representable in the input colour space are not representable in the output colour space; the mapping circuitry being configured to: convert pixels from the input colour space to an intermediate colour space in which a colour space representation of hue approximates to a consistent perceived hue independent of brightness and/or saturation; map pixels in the intermediate colour space which lie outside a region of the intermediate colour space corresponding to representable colours in the output colour space to generate mapped pixels so that the mapped pixels lie within that region, by varying the brightness and/or saturation of those pixels in the intermediate colour space but leaving the hue of those pixels substantially unchanged; and convert the mapped pixels from the intermediate colour space to the output colour space.

19 Claims, 15 Drawing Sheets

COLOUR CONVERSION

CROSS REFERENCE TO RELATED APPLICATIONS

The present application claims priority to United Kingdom application 1706005.4 filed on 13 Apr. 2017, the contents of which being incorporated herein by reference in its entirety.

BACKGROUND

Field

This disclosure relates to colour conversion.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Digital images or video signals represent images in a "colour space". This defines the set or gamut of colours which can be expressed by that signal, as well as defining a combination of colours representing pure primary colours and white, for example.

A number of different colour spaces have been defined. A colour space which can be handled by an item of equipment might be defined with respect to a theoretically available colour space such as the so-called CIE (International Commission on Illumination) 1931 colour space. For example, a so-called Rec 709 (ITU Recommendation BT.709) colour space provides a 36% coverage of the CIE 1931 space, whereas a so-called Rec 2020 (ITU Recommendation BT.2020) colour space provides a rather greater 76% coverage of the CIE 1931 colour space.

This means that there are at least a subset of colours in the Rec 2020 space which are not representable in the Rec 709 space. But note that problem this can occur even where one colour space is not in fact larger than another; there can still be colours representable in one colour space which are not representable in the other colour space.

There is therefore a general need to convert from one colour space to another. For example, a modern camera might capture images (such as images forming part of a video signal) according to the Rec 2020 colour space, but these might need to be displayed on a Rec 709 display.

SUMMARY

Respective aspects and features of the present disclosure are defined in the appended claims.

It is to be understood that both the foregoing general description and the following detailed description are exemplary, but are not restrictive, of the present technology.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
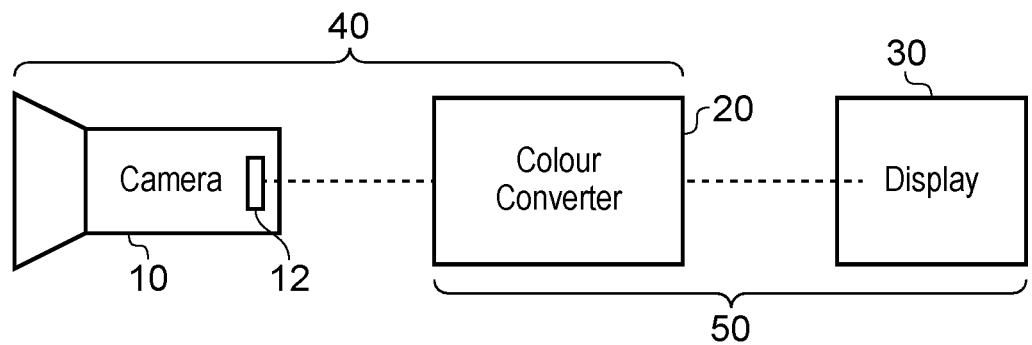
FIG. 1 schematically illustrates a camera and a display, and showing a colour conversion apparatus.

FIG. 1 schematically illustrates a camera 10 such as a video camera, having an image pick up device 12 configured to generate pixels of a captured image in an input colour space, a colour converter 20 and a display 30.

The display operates with respect to an output colour space. The input colour space and the output colour space are different colour spaces such that at least a subset of colours representable in the input colour space are not representable in the output colour space.

As mentioned above, examples of colour spaces include the so-called Rec 2020 and Rec 709 colour spaces. There are of course several other examples.

For example, in the first of these colour spaces (Rec 2020) certain colours can be represented which are simply different to, or more saturated than, the range of colours representable in the second of these colour spaces (Rec 709). Therefore, in order to display or otherwise process colours in the second (output) colour space, there is a need to convert from one colour space to another. If this is done simply by truncating otherwise unrepresentable colours into the target colour space, this can result in undesirable changes in hue, brightness and/or saturation. The colour converter 20 therefore aims to provide a better way of converting from the input colour space to the output colour space while at least alleviating some of these disadvantages.

The operation of the colour converter 20 will be discussed further below. For now, it is noted that the colour converter 20 could stand alone, or it could be part of a composite camera apparatus 40, or it could be part of a composite display apparatus 50.

In any of these instances, the colour converter 20 operates with respect to pixels of an image (or of images of a video signal) and in the case of FIG. 1 is configured to convert pixels of the captured image (in the input colour space) into pixels of an output (for example, displayable) image in the output colour space.

Figure 2:
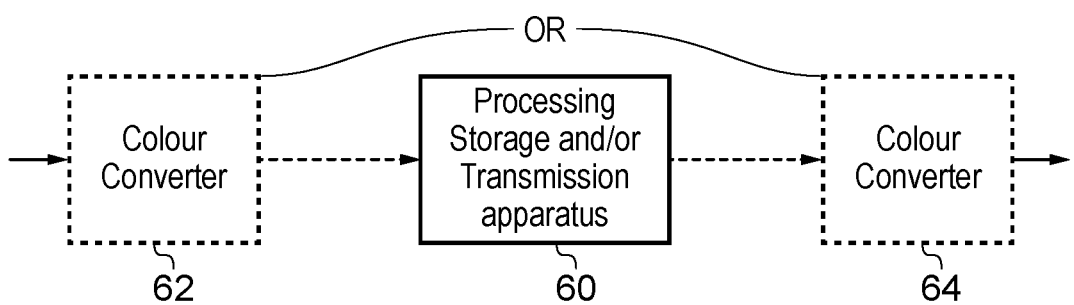
FIG. 2 schematically illustrates a processing, storage or transmission apparatus with an associated colour converter.

FIG. 2 schematically illustrates a processing, storage or transmission apparatus 60 having an associated colour converter 62, 64. Note that although the colour converter is shown twice in FIG. 2, in some embodiments only one colour converter would be associated with the processing, storage or transmission apparatus 60, associated with either the input to the apparatus or the output from the apparatus. FIG. 2 therefore provides an example of image processing, storage or transmission apparatus comprising a colour converter 62 and/or 64.

As discussed in detail below, the colour converters 20, 62, 64 can provide an example of colour conversion apparatus comprising: mapping circuitry configured to map pixels of an input image having colour components in an input colour space to pixels of an mapped image having colour components in an output colour space, the input colour space and the output colour space being different colour spaces such that at least a subset of colours representable in the input colour space are not representable in the output colour space; the mapping circuitry being configured to: convert pixels from the input colour space to an intermediate colour space in which a colour space representation of hue approximates to a consistent perceived hue independent of brightness and/or saturation; map pixels in the intermediate colour space which lie outside a region of the intermediate colour space corresponding to representable colours in the output colour space to generate mapped pixels so that the mapped pixels lie within that region, by varying the brightness and/or saturation of those pixels in the intermediate colour space but leaving the hue of those pixels substantially unchanged; and convert the mapped pixels from the intermediate colour space to the output colour space.

Also as discussed below, the colour converters 20, 62, 64 can provide an example of colour conversion apparatus comprising: mapping circuitry configured to map pixels of an input image having colour components in an input colour space to pixels of an mapped image having colour components in an output colour space, the input colour space and the output colour space being different colour spaces such that at least a subset of colours representable in the output colour space are not representable in the input colour space; the mapping circuitry being configured to: convert pixels from the input colour space to an intermediate colour space in which a colour space representation of hue approximates to a consistent perceived hue independent of brightness and/or saturation; map at least some pixels in the intermediate colour space to mapped pixels which lie outside a first region of the intermediate colour space corresponding to representable colours in the input colour space but which are within a second region of the intermediate colour space corresponding to representable colours in the output colour space, by varying the brightness and/or saturation of those pixels but leaving the hue of those pixels substantially unchanged; and convert pixels from the intermediate colour space to the output colour space.

Other examples can provide conversion (in either or both directions) between images in a so-called HDR (high dynamic range) format and images in a so-called SDR (standard dynamic range) format. The SDR images may comply with the Rec 709 colour gamut, for example. The HDR images may comply with the Rec 2020 colour gamut, for example. However, more generally, the dynamic range, or degree of variation between the least bright and most bright (or least saturated and most saturated) representable pixels, is greater for an HDR image than for an SDR image. In the present description, "HDR" and "SDR" may correspond to the use of particular colour gamuts such as Rec 2020 and Rec 709 respectively, but this is not a requirement. At a basic level, HDR images simply have a higher dynamic range than SDR images.

To the viewer observing HDR images on an HDR display, particularly bright pixels may appear brighter (than would be the case if a similar SDR image were observed on an SDR display); particularly dark pixels may appear darker (depending on the display technology being used), and amongst coloured pixels, depending of course on the image content, some of them may appear more saturated than in the SDR system.

This difference has various significant effects that are relevant to the present discussion.

Generally speaking, an SDR image may well be displayable on an HDR display (though it is noted that it is not a necessary condition that the SDR colour gamut is wholly a subset of the HDR colour gamut—there may be colours amongst the SDR pixels which are not strictly displayable on an HDR display and so a degree of colour conversion may or may not be required). However, it is possible that such an SDR image may just look disappointing to the viewer who is used to viewing HDR images. Therefore, an aim of embodiments of the present disclosure is to provide conversion from SDR images (which may have been captured or generated in an SDR format, or which may have been converted from HDR images, for example for transmission and/or storage) to images in an HDR format, for example for display on an HDR display.

Considering the opposite situation, if an attempt is made to display an HDR image on an SDR display, the full range of colour and brightness of the HDR signal cannot be handled by the SDR display and colour conversion is required. An aim of embodiments of the disclosure is to avoid a change in the hue of the pixels, as perceived by the viewer, in the conversion process from HDR to SDR formats.

Therefore, these permutations of operation means that the arrangements of FIGS. 1 and 2 encompass cameras 10 operable to capture images an SDR format or cameras 10 operable to capture images in an HDR format, displays 30 operable to display images in an SDR format or displays 30 operable to display images an HDR format, apparatus 60 operable to process, store and/or transmit images in an SDR format, apparatus 60 operable to process, store and/or transmit images in an HDR format, and the use of one, two or more colour converters 62, 64 as SDR to HDR converters and/or HDR to SDR converters, as appropriate to the particular arrangement as discussed above.

Figure 3:
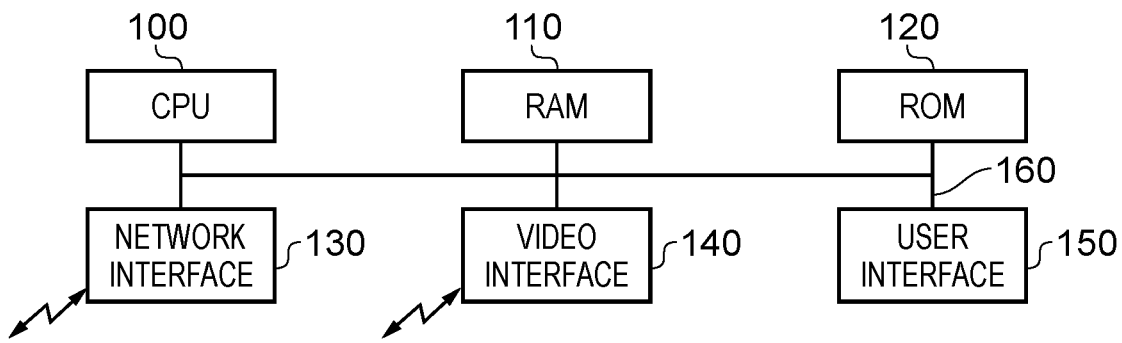
FIG. 3 schematically illustrates a data processing apparatus.

FIG. 3 schematically illustrates a data processing apparatus as an example of programmable apparatus by which the colour conversion techniques to be discussed below can be implemented. The apparatus of FIG. 3 provides an example of a software-operable programmable apparatus to implement these techniques, but it will be appreciated that in other embodiments a hard-wired physical circuit could be used, or a semi-programmable circuit such as an application specific integrated circuit (ASIC) or a field programmable gate array (FPGA) could be used.

Returning to FIG. 3, a central processing unit (CPU) 100, a random access memory (RAM) 110, a read only memory (ROM) 120, a network interface 130, a video interface 140 and a user interface 150 are all shown as example components linked together by a bus arrangement 160. In operation, the CPU 100 carries out processing instructions stored in the ROM 120 or the RAM 110, having been received, for example, via a machine-readable non-transitory storage medium and/or via the network interface 130, to process images received by the video interface 140. Processed pixel data can be stored in the RAM 110 by the CPU 100 and then passed on to a next apparatus for further handling via the video interface 140.

In general terms, the colour conversion techniques described are applicable to individual images or to video signals comprising a succession of images.

Figure 4:
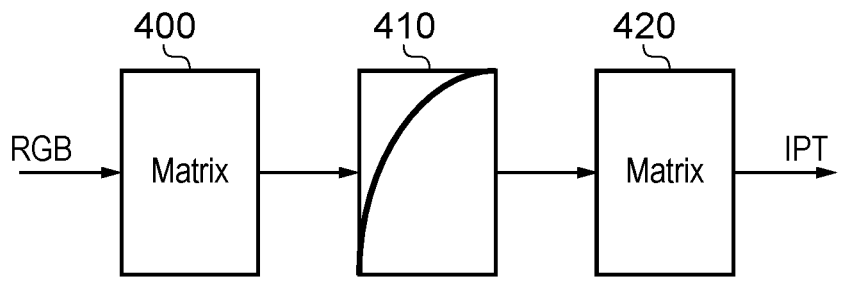
FIG. 4 schematically illustrates an RGB to IPT conversion.
Figure 5:
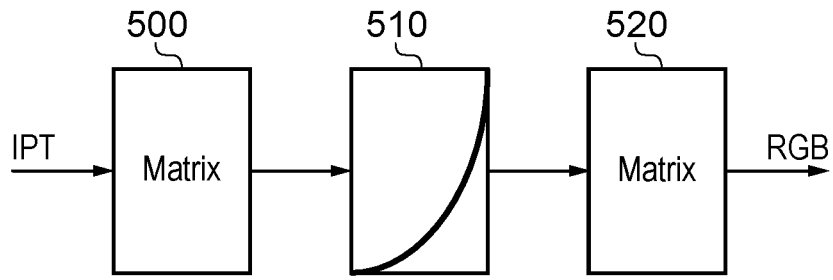
FIG. 5 schematically illustrates an IPT to RGB conversion.

FIG. 4 schematically illustrates a conversion from a red-green-blue (RGB) to a so-called IPT colour space, and FIG. 5 schematically represents a conversion from an IPT colour space to an RGB colour space. In each case, the conversion is carried out by a pair of matrix operations either side of a non-linear function such as a so-called gamma function.

In FIG. 4 a 3×3 matrix 400 is applied to pixel values of the RGB input signal, with the output of the matrix multiplication 400 being provided to the gamma function 410 which may be implemented as a one dimensional look up table (LUT) applied equally to each of the three components output by the matrix multiplication 400. The result is then matrix multiplied by another 3×3 matrix 420 to generate the IPT output. In FIG. 5 an IPT input is provided to a matrix multiplication by a 3×3 matrix 500. The results are processed by an inverse gamma function 510, for example implemented as another one dimensional LUT, with the resulting values then being matrix multiplied by a further 3×3 matrix 520 to generate the RGB output.

The conversions shown in FIGS. 4 and 5 change the representation of colour image signals and individual pixels of those colour images signals from an RGB representation to an IPT representation or the other way round, but do not change the extent of the colour space applicable to those signals, nor do they make any changes to the range of colours representable by those signals. The changes shown relating to the conversions of FIG. 4 and FIG. 5 are reversible.

Figure 6:
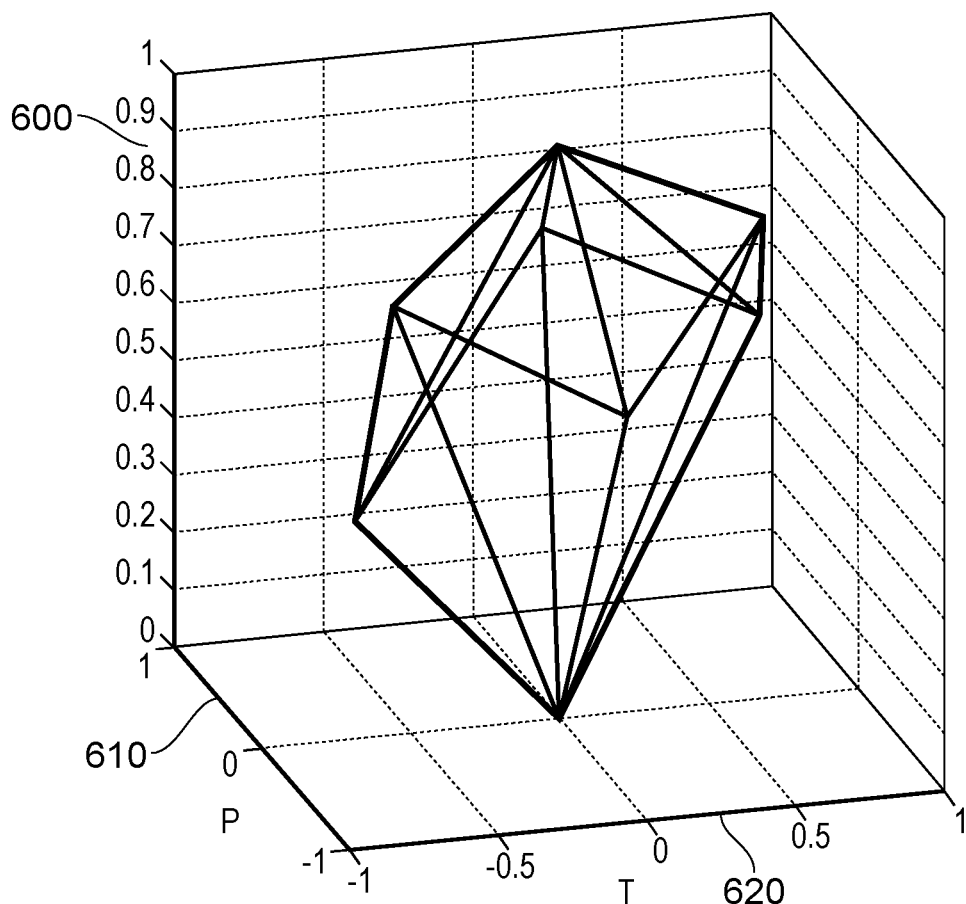
FIG. 6 schematically illustrates a Rec. 709 colour gamut in IPT space.

The colour gamut of an RGB colour space when converted to an IPT representation can be approximated by a 12-sided volume similar in form to a distorted double-hexagon pyramid. FIG. 6 schematically illustrates a Rec 709 colour gamut expressed in IPT space. Here, in common with usual representations of the IPT colour space, the vertical axis 600 represents the value I, an indication of brightness, between zero and one. The horizontal axes 610, 620 represent P,T parameters. The brightness of a pixel is represented by its height in this representation, the hue of a pixel is represented by an angular position in the PT plane, and the chroma (or in other words saturation) value is represented by a radius from the centre of the P-T plane. So:

Hue=tan−1(T/P)

Chroma=√P²+T²

Figure 7:
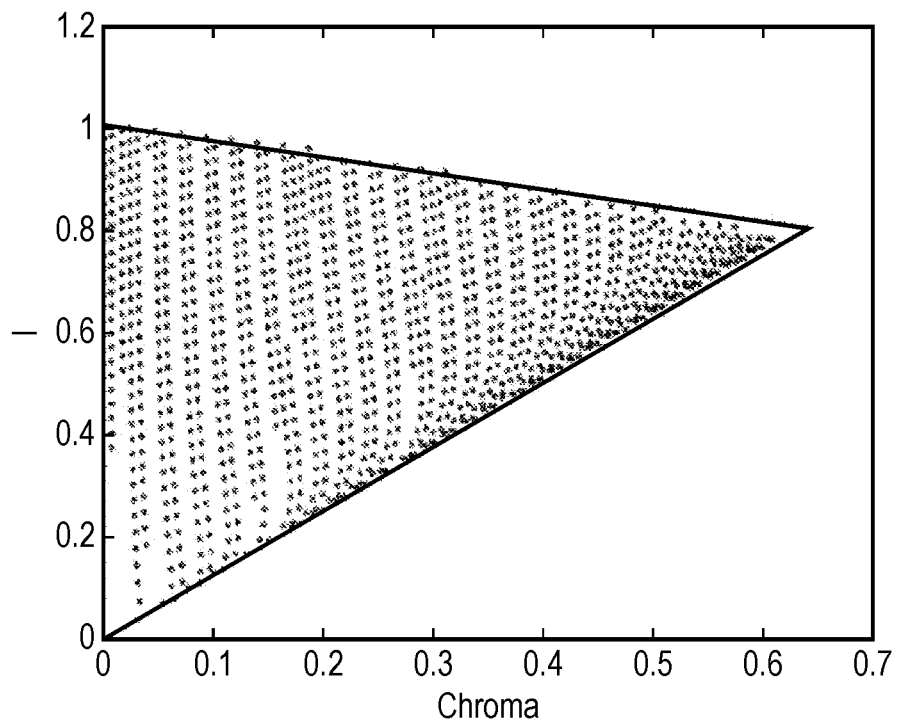
FIGS. 7 and 8 schematically illustrate triangle approximation of sections of constant hue in the colour space of FIG. 3.
Figure 8:
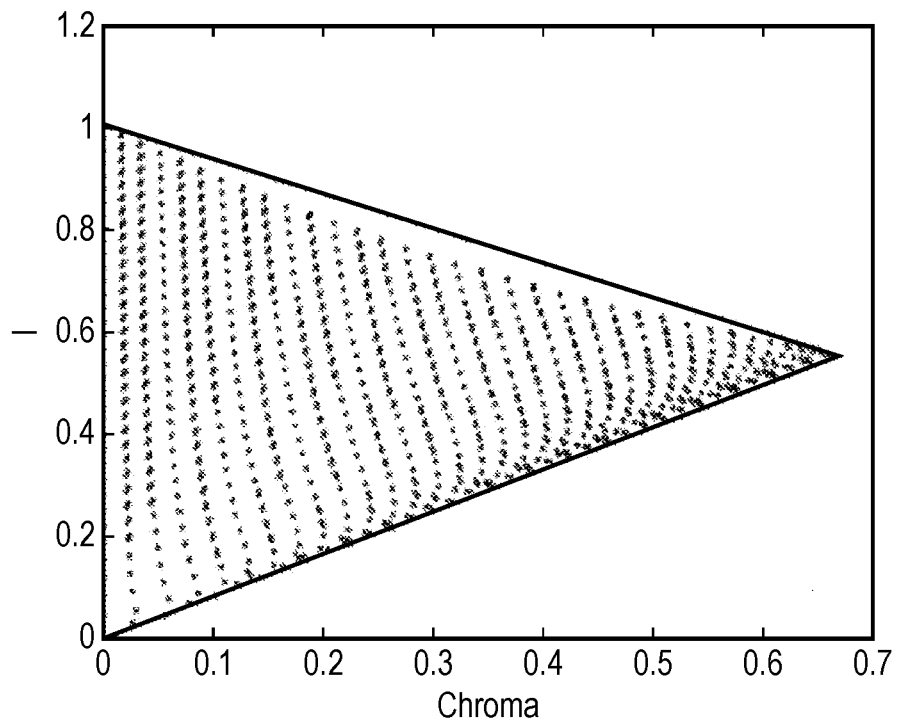

FIGS. 7 and 8 schematically illustrate triangular approximations of sections of constant hue in the colour space of FIG. 3. These representations may be envisaged as slices of the volume drawn in FIG. 6 taken at a particular hue, which is to say a particular angular orientation with respect to the P-T plane. FIG. 7 schematically represents a slice of the Rec 709 colour volume of FIG. 3 taken at hue=0 degrees, and FIG. 8 schematically illustrates a slice of the Rec 709 colour volume taken at hue=90 degrees.

Figures 9A, 9B, 9C:
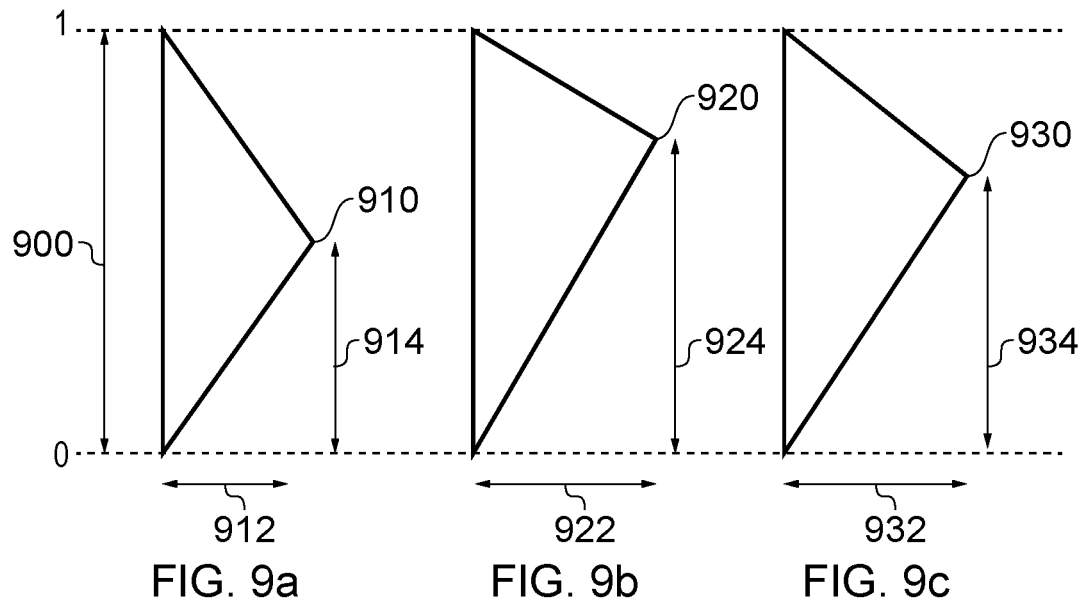
FIGS. 9a to 9c schematically illustrate parameters of triangle approximations.

FIGS. 9a to 9c schematically illustrate parameters of the triangle approximations.

The height of the triangle is fixed, extending in a direction 900 from I=0 through to I=1. This is the same for each of the triangles at any hue angle. A reason for this is that the centre of the double hex pyramid of FIG. 6 reaches a height of I=1 in the centre of the P-T plane. However, the apex 910, 920, 930 of the triangular approximation will vary in position depending upon the hue. It can be defined by a pair of parameters, being its radius 912, 922, 932 and height 914, 924, 934.

It has been found that a triangle is a good approximation of the shape of the plot of FIG. 3 at a particular hue value. The parameters defining the apex of the triangle can be selected such that valid pixels in the IPT colour space at that hue value fall within the triangle defined by that apex position.

If all pixels (in a colour conversion process) are constrained to be within this triangle then when converted back to a RGB representation they should have valid RGB values of between 0 and 1. Having said this, given that the triangle is only an approximation to the shape of the colour gamut at a particular hue, the resulting RGB values might still require a very slight clipping or other adjustment.

Figure 10:
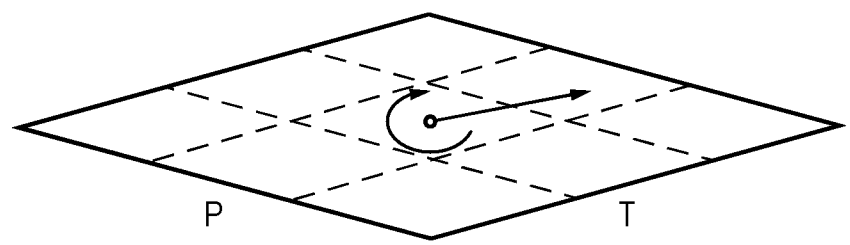
FIG. 10 schematically illustrates an angle in the P-T plane.

FIG. 10 schematically illustrates an angular position in the P-T plane corresponding to a particular hue value.

Figure 11:
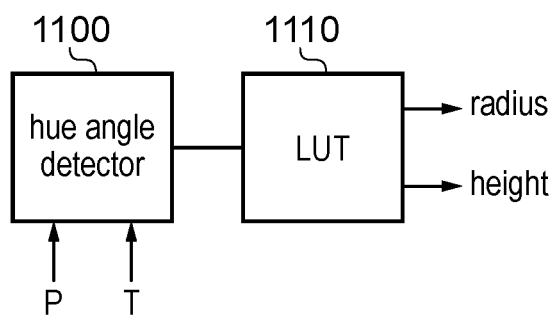
FIG. 11 schematically illustrates apparatus to derive a triangle approximation.

FIG. 11 schematically illustrates apparatus to derive the triangle approximation shown by the examples of 9a to 9c. The hue angle 1100 is provided as an input to a look up table 1110 which maps hue angle to radius and height parameters of the apex of the triangle approximation. So, for any pixel having a particular hue expressed in the IPT representation, the extent of the colour gamut at that hue (as approximated by a triangle approximation) can be established by the apparatus of FIG. 11.

Taking this technical background into account, FIGS. 12 to 19 will now be described in relation to a process and apparatus for colour space limiting, for example from an HDR representation to a representation of SDR images or video.

As discussed above, in the case of a limiting operation, for example from HDR to SDR, pixels which lie outside of the valid range of the "target" colour gamut need to be mapped to colour values within the allowable colour gamut. In the present examples, three stages are carried out in this operation and these will be discussed below.

Figure 12:
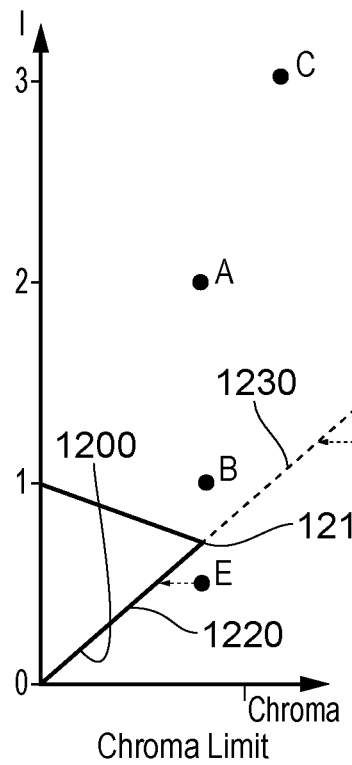
FIGS. 12 to 14 schematically illustrate stages in the operation of a colour limiting arrangement.
Figure 13:
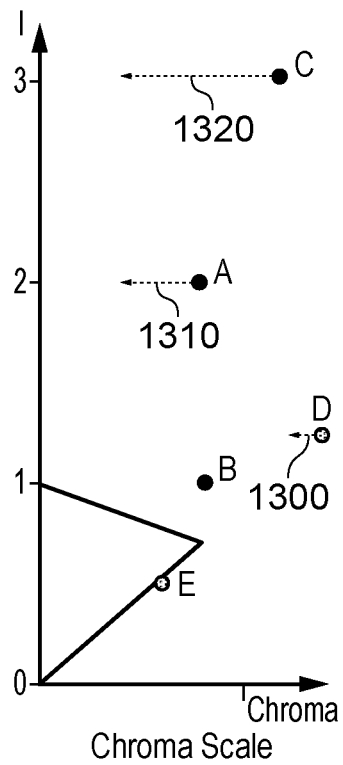
Figure 14:
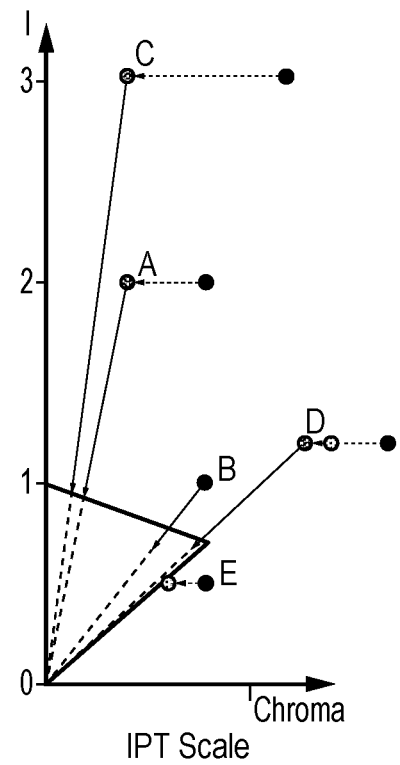

In common amongst FIGS. 12 to 14, the triangular approximation 1200 for an arbitrary hue value of a current pixel being processed is drawn, based upon reference points at I=0, 1 and an apex value 1210 derived, for example, by the apparatus of FIG. 11. Processing is applied to a current pixel having that hue value based upon the triangle approximation 1200. So, although multiple different pixels are drawn in FIGS. 12 to 14, these could be treated as examples of where a current pixel may lie in the IPT space. Alternatively, across an image all pixels having a particular hue value could be processed, followed by all pixels having a next-to-be-processed hue value and so on.

The three stages of the present example process are:

(a) In FIG. 12 the chroma (represented by a radial position in the PT plane) is limited so as to be within a larger triangle formed by extending the side 1220 of the triangle representing the allowable target colour space and which links the I=0 point and the apex 1210 in a direction indicated by a dotted line 1230. So, amongst the example pixel positions shown in FIG. 12, the pixel positions A, B, C fall within the larger triangle (being the area between the I axis and the line 1230) and no action needs to be taken at this first stage. However, pixels at pixel positions D, E in the IPT space need to be adjusted. In the example of FIG. 12, the adjustment is made by reducing the respective chroma values until the pixel positions reach the line 1220 or 1230 as appropriate. This is shown in FIG. 12 as a horizontal movement of those pixels to the left. The pixel positions of the pixels D, E in FIG. 13 are based upon the result of the movement shown in FIG. 12. This is an example of mapping circuitry configured to vary the saturation of any pixels which cannot be mapped, by the scaling of brightness and saturation in the intermediate colour space, to lie within the region of the intermediate colour space corresponding to representable colours in the output colour space, the variation of the saturation being such that pixels subject to the variation can be mapped, by the scaling of brightness and saturation in the intermediate colour space, to lie within the region of the intermediate colour space corresponding to representable colours in the output colour space.

(b) FIG. 13 shows a process of scaling the chroma value according to the level of I such that brighter colours are desaturated. So, for any pixels having an I value between I=0 and I=1, no change is made to their chroma values. However, pixels having a I value in the IPT space which is greater than one having their chroma reduced by an amount 1300, 1310, 1320 which monotonically increases with increasing I value. This is an example of mapping circuitry configured to reduce the saturation of at least some of the pixels by an amount dependent upon the brightness of those pixels. For example, the mapping circuitry may be configured to reduce the saturation of pixels having at least a threshold brightness. The threshold brightness may correspond to a maximum brightness representable in the output colour space. As shown in FIG. 13, the amount, by which the saturation is reduced, may increase with increasing pixel brightness.

(c) In a third stage illustrated in FIG. 14, the IPT values resulting from the first two stages are scaled down together such that they fit within the Rec 709 triangle. This is an example of mapping circuitry being configured to apply a scaling of brightness and saturation in the intermediate colour space, which scaling maintains a ratio of brightness to saturation, to pixels outside the region of the intermediate colour space corresponding to representable colours in the output colour space.

In some examples, a so-called "hard" limiting process is used such that the pixel positions applicable at the input of the third stage are moved, along a line between the pixel position and the origin in FIG. 14, until they reach the extent of the triangle 1200. Any pixels already within the triangle 1200 are not changed in position.

This hard limiting process could result in pixels which originally had different brightness's all ending up at the same position in the Rec 709 IPT space. So, image detail represented by those differences in brightness may have been lost. To address this, a so-called "soft" limiting process can be used. In general terms, pixel values which are not very far outside the triangle are scaled to be inside it (rather than being hard limited to the edge of the triangle) whereas pixel values a long way from the triangle 1200 are scaled to the edge of the triangle. Similarly, pixels which are at the edge or just inside the triangle can be scaled to move slightly further inside the triangle. This arrangement can preserve some of the differential between pixels of the same hue but different brightness's at the input to the third stage of FIG. 14.

Figure 15:
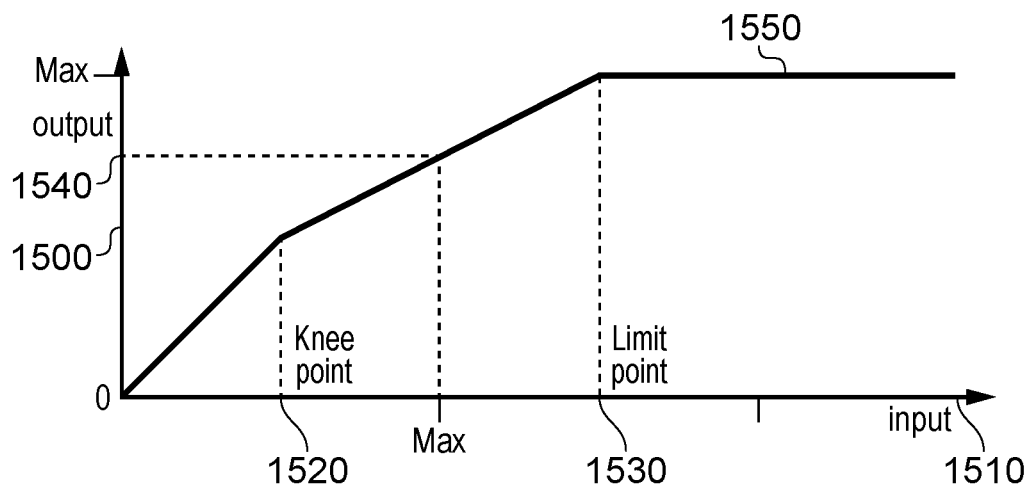
FIG. 15 schematically illustrates a soft knee function.

FIG. 15 schematically illustrates a so-called soft knee, representing a relationship between an output limited value on a vertical axis 1500 and an input value before limiting on a horizontal axis 1510. The output value on the axis 1500 runs between 0 and a maximum allowable value. The maximum allowable value corresponds to the intersection of the triangle 1200 with a straight line between the pixel position (at the input to be third stage) and the origin. So the maximum value will vary in dependence upon the chroma value, for a particular hue.

Between input values of 0 and input values corresponding to a so-called knee point 1520, there is direct mapping between input value and output value, which is to say, no change. Between the knee point and a limit point 1530, between which the maximum value is disposed, there is a more gradual relationship so that any input value at the limit point is mapped to the value max, an input value at the value max is mapped to a value 1540 less than max, and any input value above the limit point is mapped (by virtue of a flat section of the curve 1550) to the value max as an output value.

This is an example of the mapping circuitry being configured to map a pixel, at a pixel position in a range of pixel positions in the intermediate colour space including a predetermined boundary portion of the region of the intermediate colour space, to a mapped pixel at a pixel position in the range of pixel positions having a lower brightness and saturation.

Figure 16:
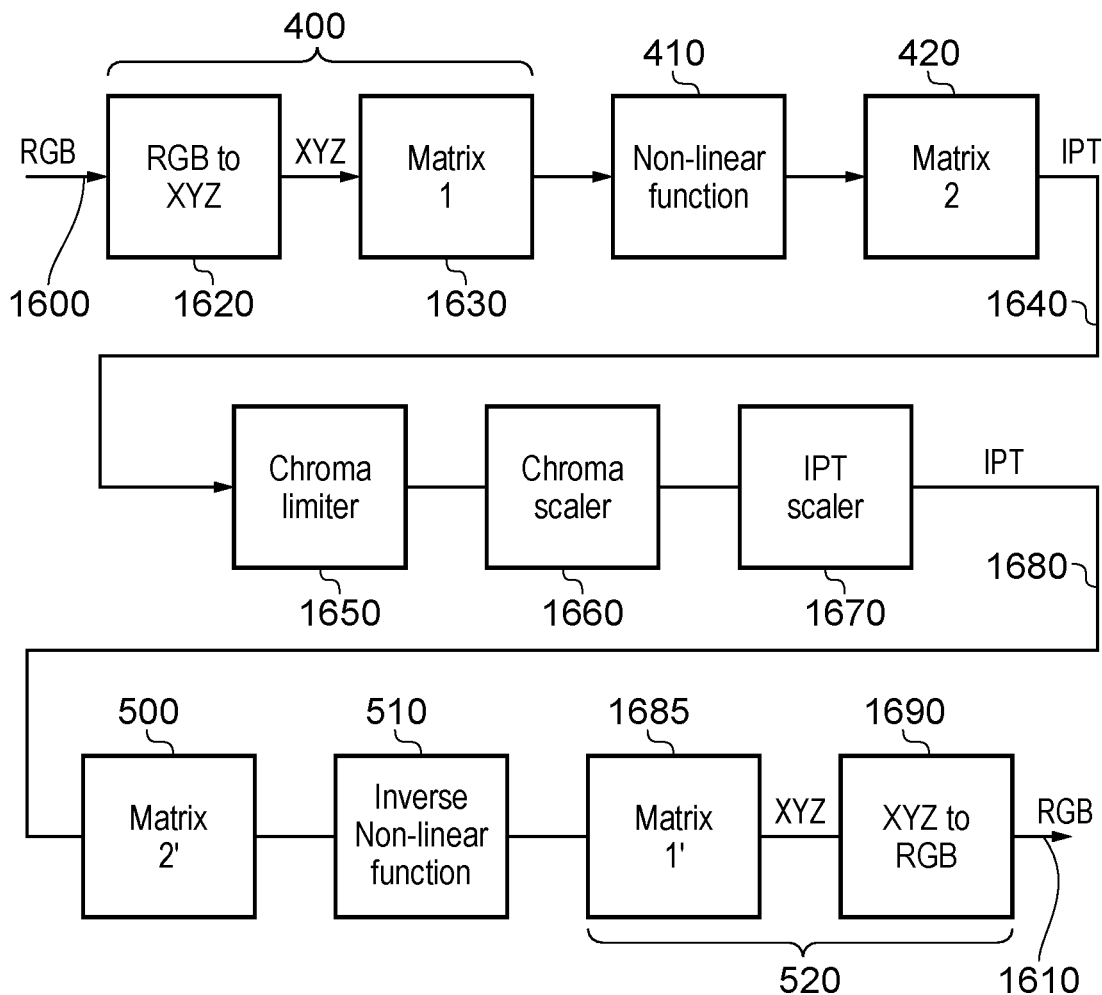
FIG. 16 schematically illustrates a colour space limiting apparatus.

FIG. 16 schematically illustrates a colour space limiting apparatus making use of the principles discussed above. In this apparatus, an input RGB signal 1600 is provided at a top left side of the arrangement as drawn, and an output RGB signal 1610 is provided at the bottom right as drawn. Note that the input and/or output signals need not be RGB signals; they could be other representations such as YCrCb or YUV representations. RGB is used simply for this example. In the context of a colour space limiting operation the input RGB signal 1600 is a rec 2020 signal and the output signal 1610 complies with the rec 709 colour space.

The first line of the schematic representation of FIG. 16 represents the conversion to the IPT colour space. Here, operations which mirror those shown in FIG. 4 are provided, except that the first stage matrix multiplication 400 is represented here schematically by two matrix multiplications, one to transform between the RGB representation (R, G, B) and a so-called XYZ representation (a matrix multiplication 1620) and one to transform between the XYZ representation and an input to the non-linear function, namely a matrix multiplication by a 3×3 matrix 1630. The non-linear function 410 and a second matrix multiplication 420 are as discussed with reference to FIG. 4, resulting in an IPT format signal 1640 being provided to the second line of FIG. 16.

An example of the matrix 1620, in the case of Rec 2020 to XYZ conversion, is as follows:

$$\begin{pmatrix} 0.6370 & 0.1446 & 0.1689 \\ 0.2627 & 0.6780 & 0.0593 \\ 0 & 0.0280 & 1.0608 \end{pmatrix}$$

An example of matrix 1 (1630) is as follows:

$$\begin{pmatrix} 0.4002 & 0.7075 & -0.0807 \\ -0.2280 & 1.1500 & 0.0612 \\ 0.0000 & 0.0000 & 0.9184 \end{pmatrix}$$

An example of the non-linear function is to raise each value to the power of 0.43.

An example of matrix 2 (420) is as follows:

$$\begin{pmatrix} 0.4000 & 0.4000 & 0.2000 \\ 4.4550 & -4.8510 & 0.3960 \\ 0.8056 & 0.3572 & -1.1628 \end{pmatrix}$$

The stage 500 can involve a division by the example matrix 2. The stage 510 can involve arising to the power of (1/0.43). The stage 1685 can involve division by the example matrix 1.

A matrix for conversion from Rec 709 (R, G, B) to XYZ (and which is relevant to the use of the matrix 1620' referred to in FIG. 25) is as follows:

$$\begin{pmatrix} 0.4124 & 0.3576 & 0.1805 \\ 0.2126 & 0.7152 & 0.0722 \\ 0.0193 & 0.1192 & 0.9505 \end{pmatrix}$$

The stage 1690 in FIG. 16 (conversion to Rec 709 RGB) can involve division by the example matrix 1620'.

In the second row of FIG. 16, a three stage process as discussed above with reference to FIGS. 12 to 14 is carried out, namely a chroma limiter 1650 carries out a first stage, followed by a chroma scaler 1660 carrying out a second stage, followed by an IPT scaler 1670 carrying out a third stage, resulting in a limited IPT representation 1680. This is passed to effectively the arrangement of FIG. 5, namely a first matrix multiplication 500 being the inverse of the matrix multiplication 420, an inverse non-linear function 510 and the final matrix multiplication which in this example is shown as a final stage 1685 to convert back to an XYZ representation followed by an XYZ to RGB conversion by a matrix multiplication 1690.

The second row of FIG. 16, or any one or more blocks of it, may be considered as an example of a colour conversion apparatus, with or without the upper and lower rows of FIG. 16.

Figure 17:
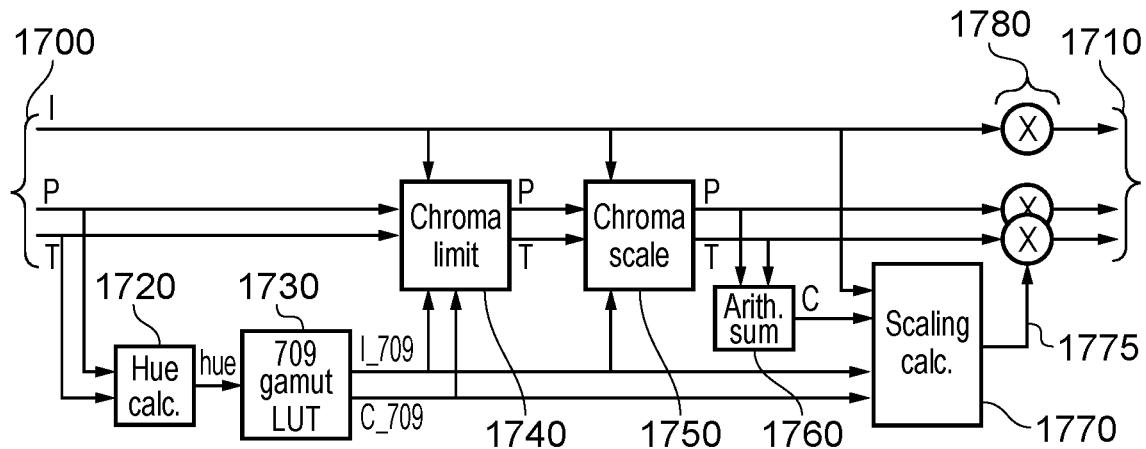
FIGS. 17 to 19 schematically illustrate examples of colour limiting apparatus.

FIG. 17 schematically illustrates an example limiting apparatus which operates on an input IPT signal and generates an output IPT signal 1710. So, the apparatus of FIG. 17 represents an example of the second row of FIG. 16.

The P, T components of the input signal 1700 are processed by a hue calculator 1720 (similar to the block 1100 of FIG. 11) which performs the derivation Hue=$\tan^{-1}$(T/P)

A "709 gamut LUT" 1730 represents an example of the LUT 1110 of FIG. 11 and stores the attributes (such as coordinates) of the apex of the triangle approximating the output colour gamut in the IPT representation, for the hue appropriate to the current pixel. The LUT 1730 outputs these coordinates as I_709 and C_709.

A "Chroma limit" block 1740 calculates the relative ratios of I/Chroma for the input pixel and for the apex point and then scales P,T accordingly, in order to limit chroma as discussed above. An example of the equation used is:

Limited $P,T=P,T*(C\_709*I\_in)/(I\_709*C\_in)$

A "Chroma scale" block 1750 progressively scales down P,T as the I value of the pixel gets bigger than the I value of the apex (I_709) as discussed above. An example of the equation used is:

Scaled $P,T=P,T*1.3/(1+I\_in-I\_709)$

A final "Scaling calc" block calculates where the dashed line 1230 intercepts with the upper limit of the triangle, then applies a soft limit according to this ratio. This is based on an arithmetic sub=m of the chroma-scaled P, T values and generates a gain 1775 which is applied by multipliers 1780 to all three IPT components.

This process involves calculation of the intercept of the lines C_in,I_in . . . 0,0 and C_709,I_709 . . . 0,1:

C intercept=$1/(I\_in/C\_in+(1-I\_709)/C\_709)$

I intercept=$C\_intercept*I\_in/C\_in$

Thus the scaling is taken from the ratio:

Ratio=$1/(I\_in+(1-I\_709)*C\_in/C\_709)$

Then soft limiting is applied to this ratio:

If Ratio<1/Limit

IPT scale=$1/(I\_in+(1-I\_709)*C\_in/C\_709)$

Else if Ratio<1/Knee

IPT scale=$1/\text{Limit}+(1-1/\text{Limit})*(\text{Ratio}-1/\text{Limit})/(1/\text{Knee}-1/\text{Limit})$ Else IPT scale=1

The complete process of FIG. 17 could be implemented in one large 3D LUT. In other examples, it can be split into sub functions using smaller LUTs for better accuracy/smaller hardware as shown in FIG. 18.

Figure 18:
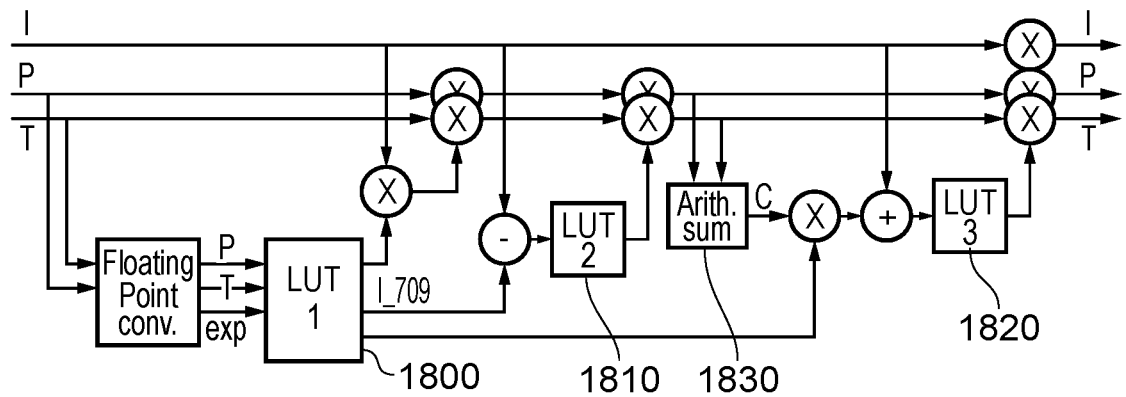

FIG. 18 uses three LUTs: LUT 1 (1800), LUT 2 (1810), LUT 3 (1820), producing values which are combined by respective multipliers.

Each LUT is now only 2D or 1D which should result in a significant reduction in the total storage required. LUT 1 could be made smaller by converting the input P,T values to floating point as hue is calculated from their ratio, this LUT generates three values:

(C_709*I_in)/(I_709*C_in)

I_709

(1-I_709)/C_709

LUT 2 generates the value:

1.3/(1+I_in-I_709)

LUT 3 calculates a reciprocal and the soft limiting.

Figure 19:
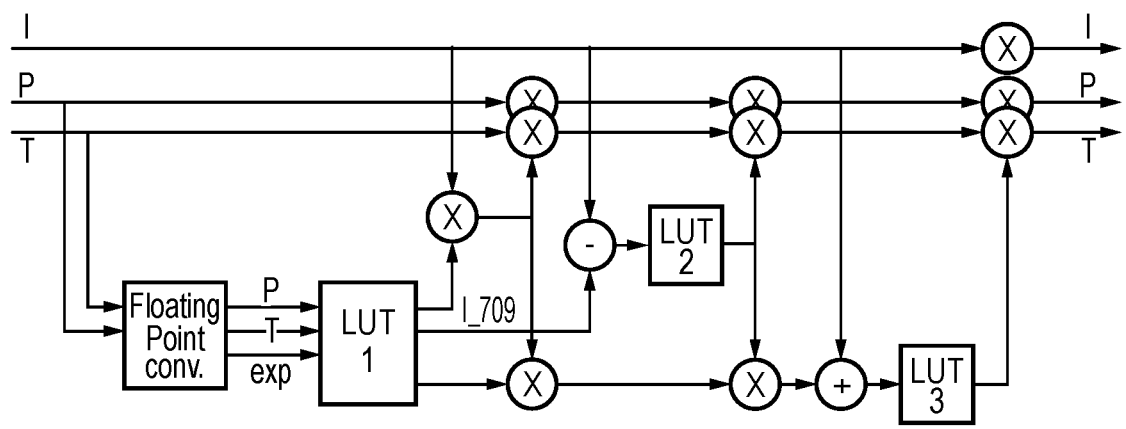

The arithmetic sum of scaled P,T (1830) could also be implemented as a LUT but can instead be integrated into LUT1's third output, which is to say that LUT1 calculates chroma from P,T before the first two stages of scaling and multiplies by (1−I_709)/C_709, the implementation would then be as shown schematically in FIG. 19.

In FIG. 19, LUT1's outputs are now:
(C_709*I_in)/(I_709*C_in)
I_709
$\sqrt{P^2+T^2}$*(1−I_709)/C_709

As the only direct processing applied to IPT is a multiplication (shown schematically as a series of multiplications) this could be done at full precision with a lower precision used for the calculation of that multiplier. Note that as IPT is not a linear signal it is not necessary to use the full 16 bits precision.

As discussed above, example arrangements can provide a scaling or up-conversion process in order to convert from, for example, an SDR representation to an HDR representation of image or video material.

Example situations in which this may be useful can include:
 a) Substantially "undoing" a previously performed HDR to SDR limiting process (whether by the techniques described above or by other colour space limiting techniques); or
 b) Upscaling the dynamic range of a received or retrieved SDR signal for display by an HDR display or handling by an HDR compatible channel.

In the examples, assume that the SDR signal complies with rec 709 and the desired HDR signal complies with rec 2020. However, these are just examples and other colour spaces and/or formats could be used.

Figure 20:
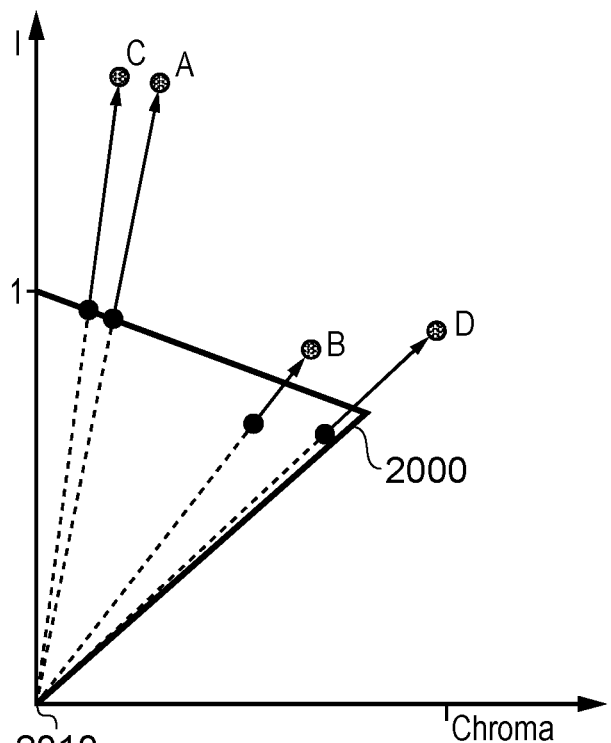
FIG. 20 schematically illustrates an IPT scaling step.

FIG. 20 schematically illustrates an IPT scaling step. Here, pixel values which are close to the limit of the SDR colour space (that is to say, in the representation of FIG. 20), close to the boundaries of the triangle 2000 representing the allowable colour space at a particular chroma value, or at least a substantial approximation of that allowable space. These are boosted to new pixel values potentially outside of the triangle 2000. In some examples, this can be based on an assumption that these values were previously limited and were originally out of the allowable range of the triangle 2000. However, this is not a requirement and the scaling function shown in FIG. 20 could be applied even if a previous limiting function had not been applied. FIG. 20 therefore provides an example in which the mapping circuitry is configured to apply a scaling of brightness and saturation in the intermediate colour space, which scaling maintains a ratio of brightness to saturation, to generate pixels corresponding to representable colours in the output colour space.

Figure 21:
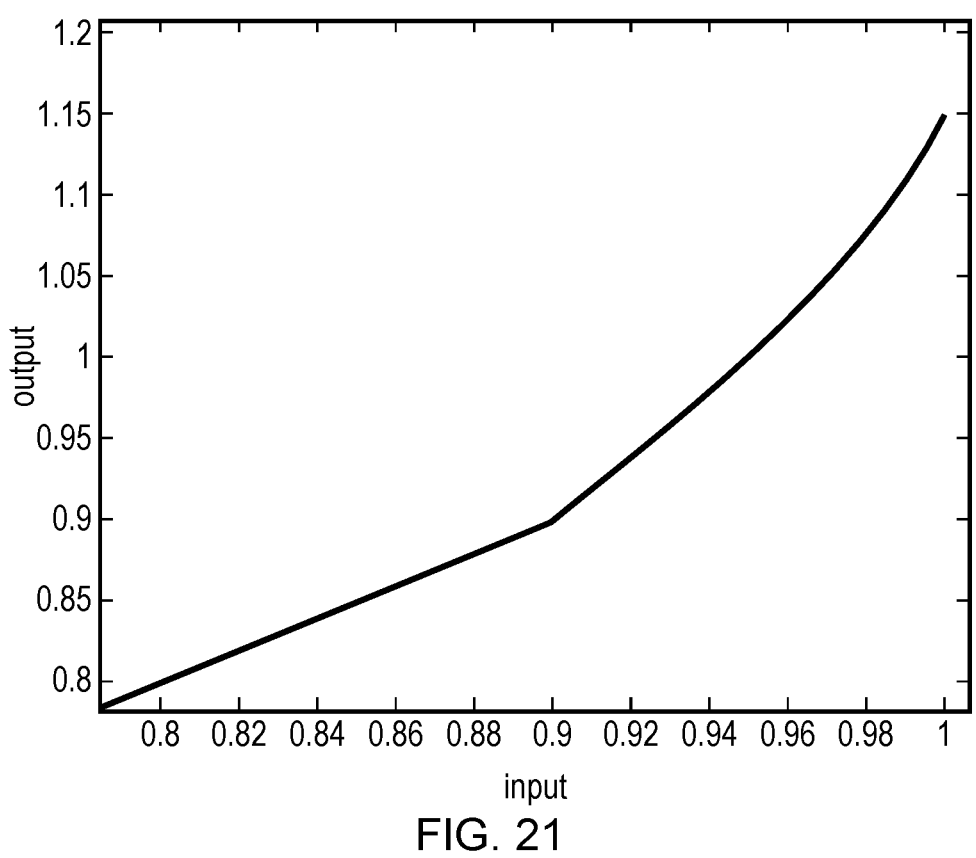
FIG. 21 schematically illustrates an IPT scaling function.

In some examples, a non-linear scaling function can be used. For example, as shown in FIG. 21 in which a mapping between input values on a horizontal axis and output values on a vertical axis is shown, the scaling is 1:1 up to input values of 90% of the allowable maximum value defined by the triangle 2000 at that chroma and I value for the current hue. Input values above 90% of the relevant maximum value are scaled non-linearly so as to map to higher output values extending beyond the triangle 2000.

In FIG. 21, an input value equal to the maximum value defined by the triangle 2000 is mapped to an output value of around 1.15× that maximum. In FIG. 20, this process is shown in a slightly exaggerated form for clarity, such that pixels A, C which lay on the boundary of the triangle 2000 are mapped to positions well outside the triangle 2000, and pixels B, D which lay just inside the triangle 2000 (considered in the direction of a straight line between the initial pixel position and the origin 2010) are mapped by a lesser amount beyond the border of the triangle 2000.

The example of FIG. 21 therefore provides an example in which the mapping circuitry is configured to map a pixel in a predetermined boundary portion of the region of the intermediate colour space to a mapped pixel at a pixel position in a range of pixel positions in the intermediate colour space including the predetermined boundary portion and having a greater brightness and saturation.

Figure 22:
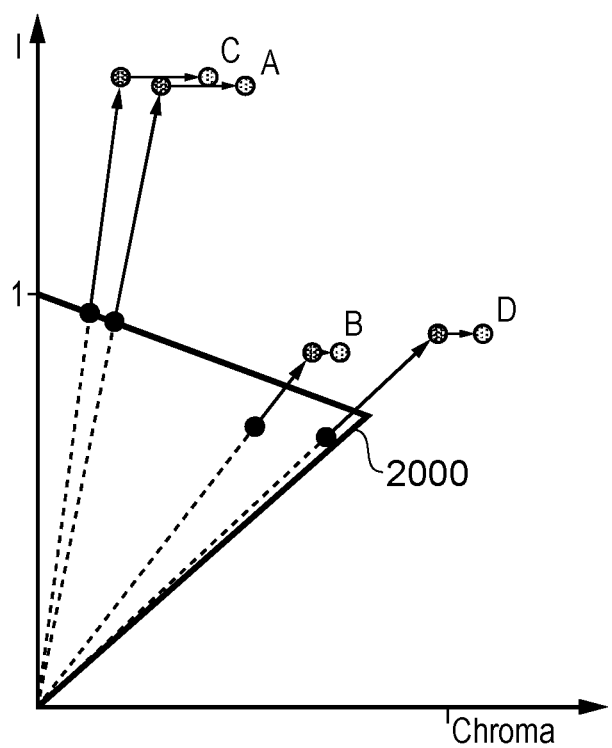
FIGS. 22 and 23 schematically illustrate IPT scaling steps.

In a second step illustrated by FIG. 22, the chroma of bright pixels (that is to say, pixels outside the triangle 2000) is increased, on the assumption that any previous limiting would have had a desaturating effect.

Figure 23:
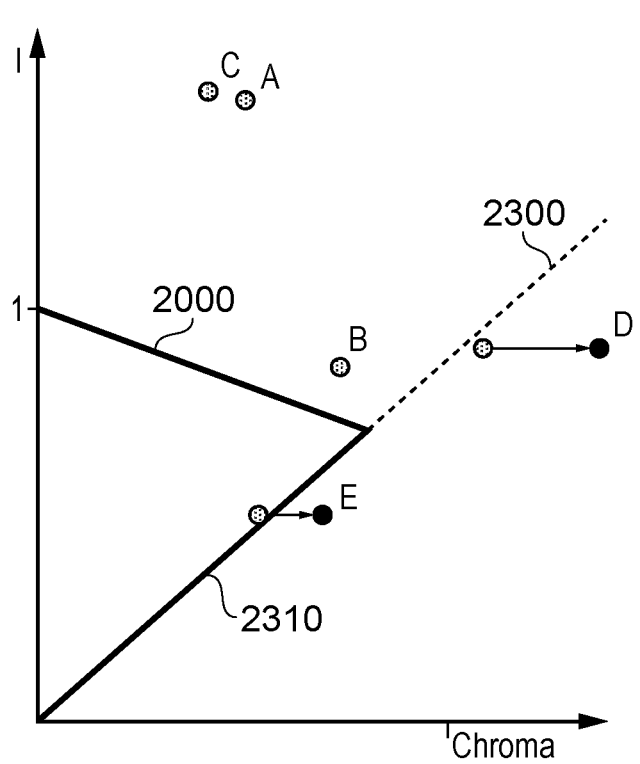

A third step, illustrated schematically in FIG. 23, is to increase the chroma of values that are near to or even beyond the maximum chroma of the input colour space such as rec 709, again on the assumption that the chroma may previously have been limited. For example, in an IPT-based limiting algorithm such as that discussed above, such a limiting process may have been deliberately done. In an RGB-based limiting algorithm (not described here, but which may have been carried out at an image source or intervening process), this may have been the result of negative components having been clipped to zero. The increase in chroma value is represented by a horizontal movement to the right, beyond a line 2300 representing an extension of the side 2310 of the triangle 2000 between the origin and the apex. Any pixel values close to or to the right of that line are scaled in their chroma value. Once again, a soft or non-linear scaling may be used as illustrated schematically in FIG. 24, in which any pixel having a chroma value up to (say) 80% of the maximum chroma value defined by the lines 2300, 2310 remains unchanged, whereas any input chroma values greater than 80% of the maximum allowable chroma for that I value are scaled to higher output chroma values.

These increases in chroma can provide examples in which the mapping circuitry is configured to increase at least the saturation of at least some pixels mapped to mapped pixels outside a region in the intermediate colour space corresponding to colours representable in the input colour space. For example, the mapping circuitry may be configured to increase the saturation of at least some of the mapped pixels by an amount dependent upon the brightness of those mapped pixels. For example, the mapping circuitry may be configured to increase the saturation of mapped pixels having at least a threshold brightness. For example the threshold brightness may correspond to a maximum brightness representable in the input colour space. For example the amount, by which the saturation is increased, may increase with increasing pixel brightness.

Figure 25:
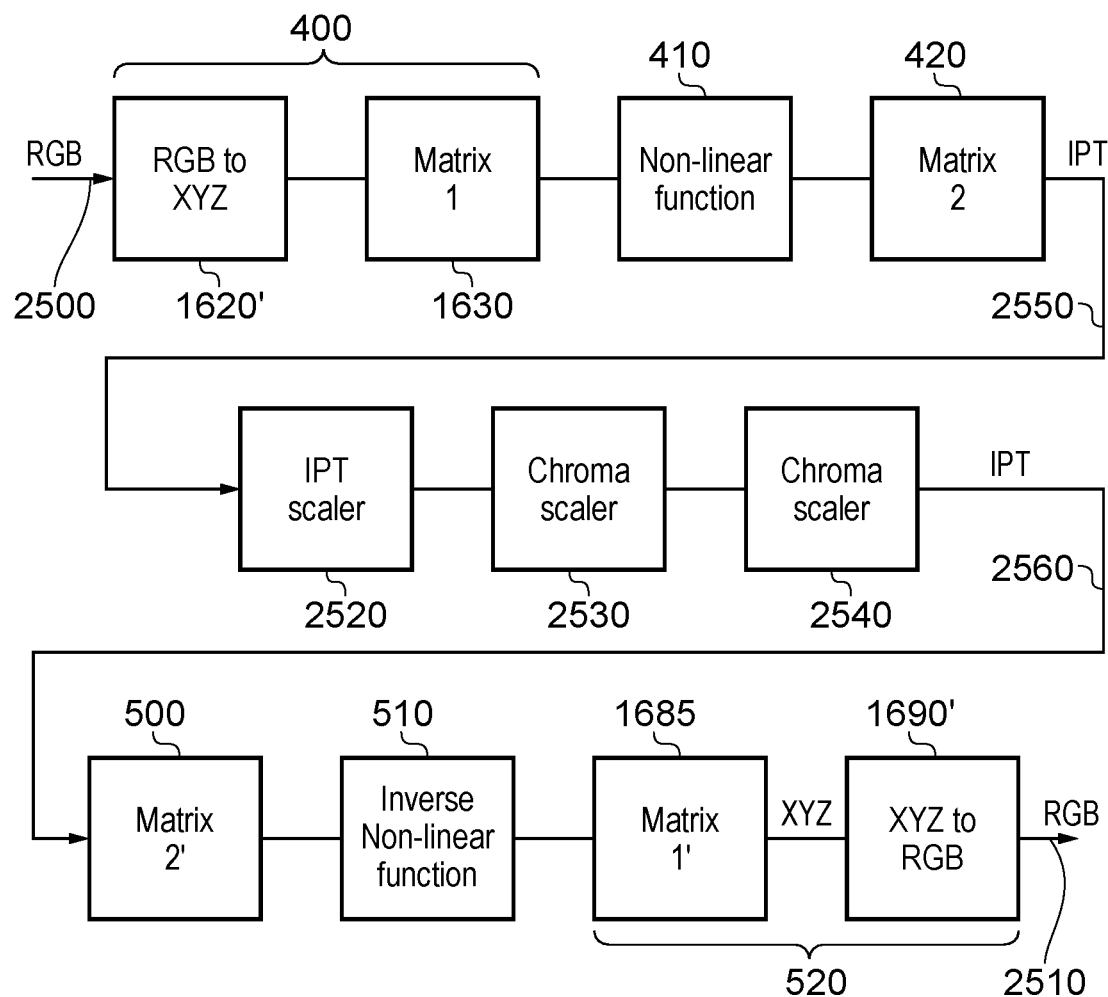
FIG. 25 schematically illustrates an unlimiting apparatus.

FIG. 25 schematically illustrates an unlimiting apparatus. Note that the term "unlimiting" does not necessarily imply that that signal had been previously limited. The techniques are applicable to previously limited signals but are also applicable to signals originating (for example, captured) in SDR or another format such that an output is generated potentially including colours not representable in the input format.

The representation is similar to FIG. 16 and, apart from the fact that an input signal 2500 is an SDR signal and an output signal 2510 is an HDR format signal, the first and third lines of FIG. 25 are functionally the same as the first and third lines of FIG. 16. The matrix 1620' is a Rec 709 to XYZ matrix as discussed above, and the stage 1690' involves dividing by the matrix 1620 discussed above, namely the Rec 2020 to XYZ matrix. In other respects the first and third rows of FIG. 25 correspond to the operations of the first and third rows of FIG. 16.

Figure 24:
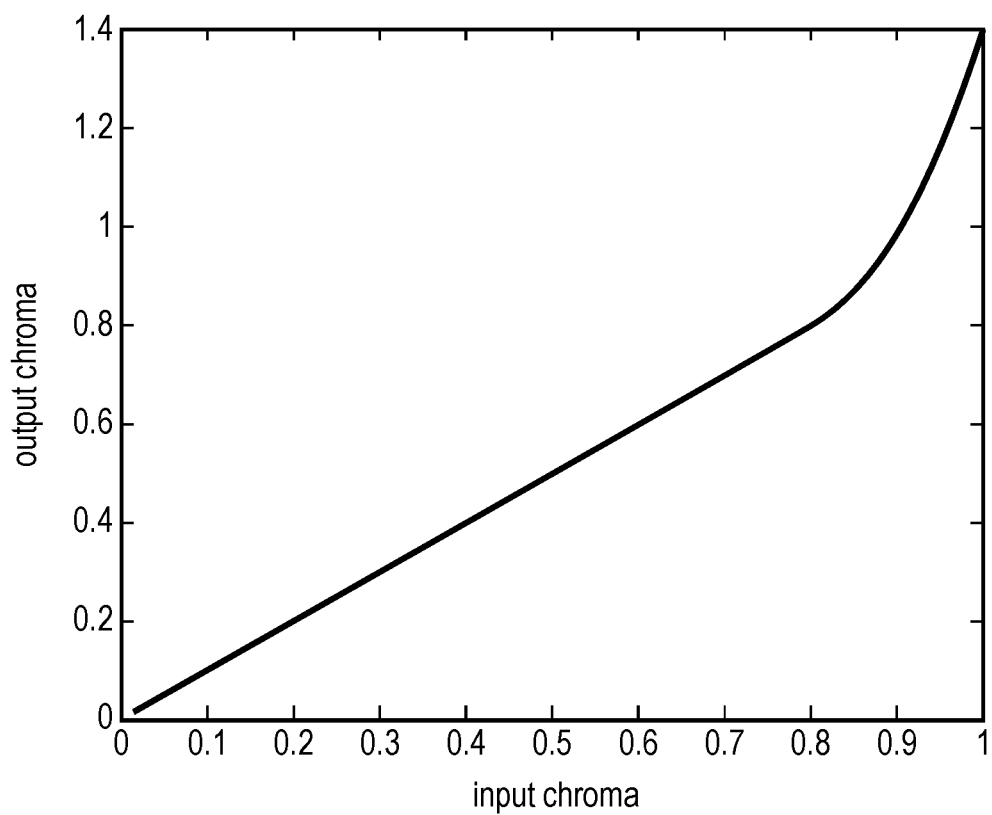
FIG. 24 schematically illustrates a chroma scaling function.

The second line of FIG. 25 receives an IPT format signal 2550 which is processed by an IPT scaler carrying out the functionality shown in FIGS. 20 and 21, a chroma scaler 2530 carrying out the functionality shown in FIG. 22 and a chroma scaler 2540 carrying out the functionality shown in FIGS. 23 and 24. This leads to the generation of an up-scaled dynamic range signal 2560 still in an IPT format which is then converted back to an output format such as RGB as the output signal 2510.

The second row of FIG. 25, or any one or more blocks of it, may be considered as an example of a colour conversion apparatus, with or without the upper and lower rows of FIG. 25.

Figure 26:
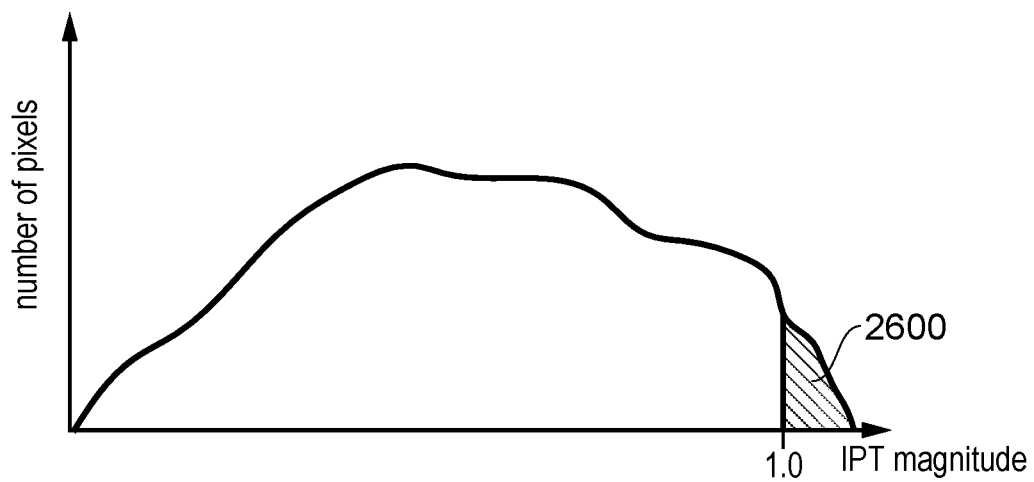
FIG. 26 schematically illustrates a pixel distribution.
Figure 27:
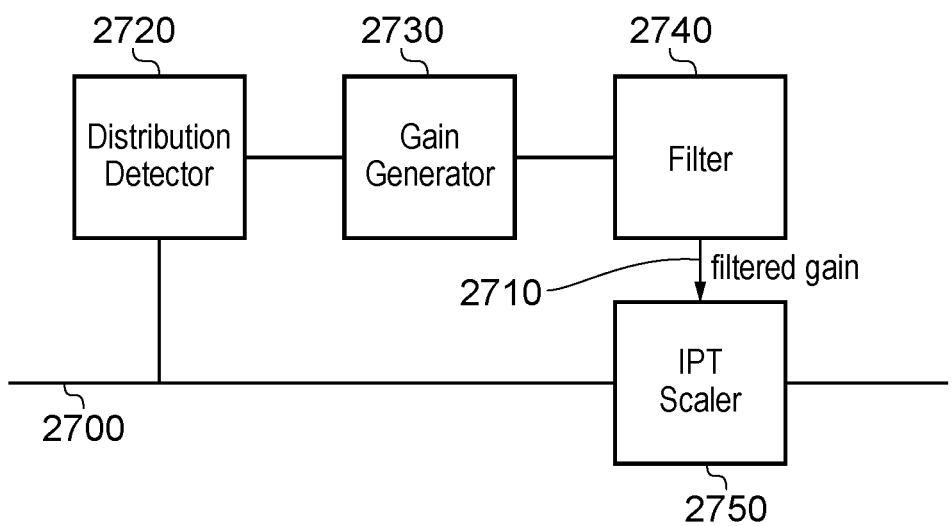
FIG. 27 schematically illustrates a brightness control function.

FIG. 26 schematically illustrates a pixel distribution and FIG. 27 schematically illustrates a brightness control function.

In order to reduce the amount of processing which needs to be carried out in HDR to SDR conversion (limiting), an auto brightness function can be a simple scaling to reduce the number of pixels which are outside of an approximation to the allowable SDR range in IPT space, in which the magnitude of IPT is less than one. For example, the scaling could be applied so as to keep at least 97% of pixels within the output range. This means that the magnitude of IPT ($\sqrt{(I^2+P^2+T^2)}$) is that less than 1.0 for that 97%.

FIG. 26 schematically illustrates a distribution of the number of pixels against IPT magnitude illustrating a proportion 2600 such as 3% which are outside an IPT magnitude of 1.0. In other words, FIG. 26 represents the desired outcome of the IPT scaling process. If an initial pixel distribution is such that more than this proportion of pixels are outside of the IPT magnitude of 1.0, all of the pixels are scaled by a gain value derived as discussed below. The gain value is derived so that, if it were applied to all pixels of the current image, no more than 3% of those pixels would lie in the region 2600, above an IPT magnitude of 1. If no pixels exceed this magnitude then the gain value can be 1. Of course, if the gain value is derived from (say) an immediately preceding image, this would be an approximation, and also if a filtered gain value is used, the actual number exceeding an IPT magnitude of 1 might be different to 3%.

Referring to FIG. 27, input pixel values 2700 are multiplied by a gain value 2710 by an IPT scaler 2750 (for example, a set of multipliers each multiplying a respective I, P, T component by the gain value 2710). With reference to the arrangement of FIG. 16, in an example this can be applied to the signal 1640 before the input of the chroma limiter 1650.

To derive the gain value, a pixel distribution detector 2720 acts on pixels of the input signal 2700 to detect the distribution of their IPT magnitude values. A gain generator 2730 generates a gain value from the detected distribution, for example in respect of each image, or in respect of a most recent complete image, or in respect of a rolling complete image including a most recent pixel value at each pixel position up to the current pixel position. In some examples, this can be used as the gain value 2710 to be applied by the IPT scaler 2750, but in other examples a filter 2740 is used so as to inhibit sudden or large changes in the gain value. An example of the filter operation is shown below:

filtered_gain=alpha*gain+(1−alpha)*prev_filtered_gain where filtered_gain is the gain value 2710 supplied to and used by the IPT scaler 2750; gain is the "raw" gain value generated by the gain generator 2730 based on the prevailing distribution of pixel values detected by the distribution detector 2720; prev_filtered_gain is a previously derived value of filtered_gain, for example relating to a preceding image. A possible value for the variable alpha is 0.125.

In the example of FIGS. 26 and 27, the mapping circuitry is configured to: apply a gain to the pixels in dependence upon a gain factor; and generate the gain factor in dependence upon a distribution of pixel values of the pixels. For example, the mapping circuitry may be configured to generate the gain factor so that no more than a predetermined proportion of pixels in the input image, if scaled according to the gain factor, would have colours not representable in the output colour space. For example, the mapping circuitry may be configured to filter the gain factor so as to reduce changes in the scaling factor applicable to successive input images.

Figure 28:
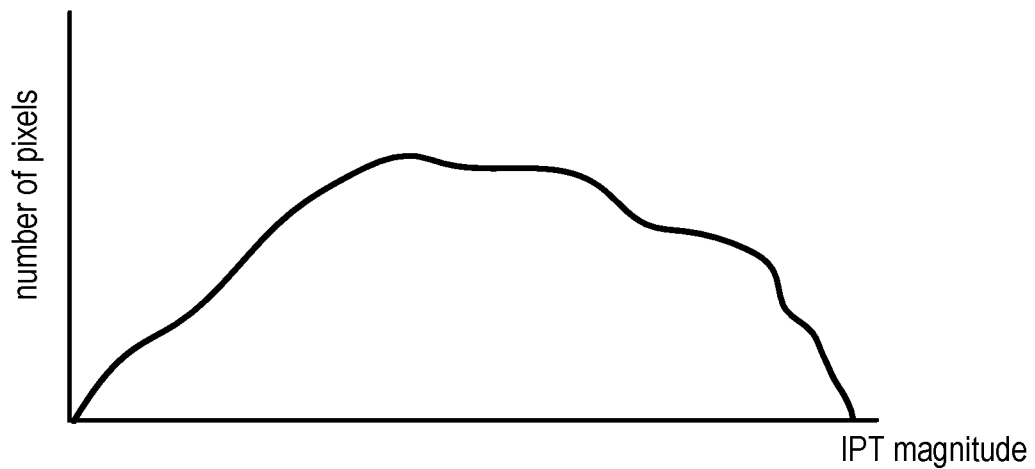
FIG. 28 schematically illustrates a pixel distribution.

In SDR to HDR conversion, a similar arrangement can be used, based upon the example histogram shown in FIG. 28. As before, a distribution detector 2930 detects a histogram distribution such as that shown in FIG. 28, which may relate to a current image, a most recent image, a rolling image or the like. A gain generator 2940 generates a "raw" gain value as discussed below. This can be used directly by an IPT scaler 2960 or can be filtered by a filter 2950. The arrangement of FIG. 29 can fit into the schematic diagram of FIG. 25 at the output of the chroma scaler 2540, and is applied to the signal 2560 before its input to the matrix 500. That is to say, the arrangement of FIG. 29 can be implemented after IPT-based expansion (unlimiting) and before the conversion from IPT to another format.

When the brightness of an image is changed then it can also be appropriate to adjust the gamma for the best (or a better) subjective effect. The gamma is therefore adjusted according to the gain, from 1.0 to 1.15. Note that this mirrors the gamma adjustment in the IPT-based limiting algorithm.

Figure 29:
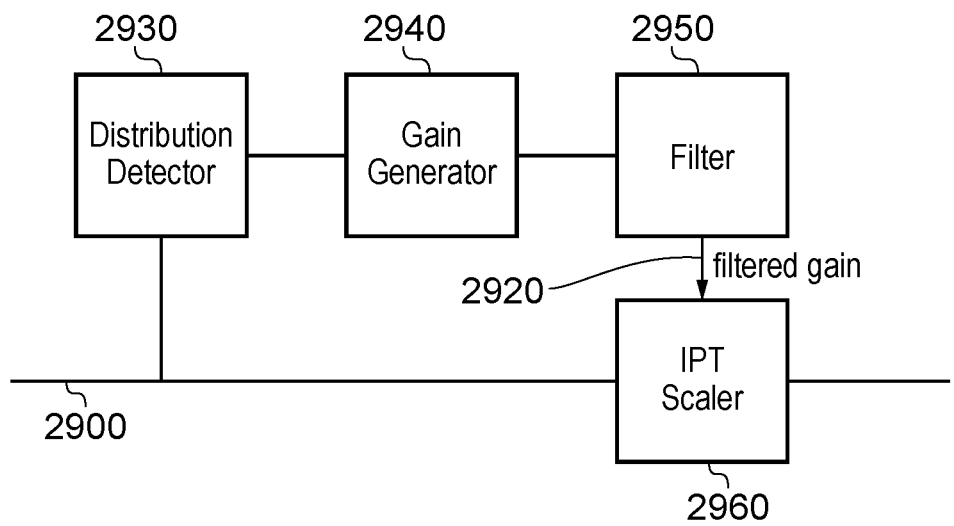
FIG. 29 schematically illustrates a brightness control function.

In the case of SDR to HDR conversion, the auto brightness function of FIG. 29 is based on the energy (the population of pixels in the distribution) at each end of the histogram. If the histogram of FIG. 28 is defined or normalised as extending (along the IPT magnitude axis) between 1 and 100. Note that a range of 0 to 100 could be used. However, in some examples the range of 1 to 100 is used, for example to exclude pixels which have been set to black by a so-called "letter box" process converting between aspect ratios by inserting black regions into the images. The variable "hist(A:B)" represents the pixel population between the normalised histogram bins of A and B inclusive, then two variables "lo" and "hi" are defined:

lo=hist(1:15)/hist(1:100)

hi=hist(80:100)/hist(1:100)

Then gain=1+13*hi*(1+0.6*(10*lo−1))

Optionally gain can also be limited to a maximum (such as 2.2) As discussed above, the "raw" gain as derived above can be used by the IPT scaler 2960 (again, one or more multipliers, for example, to multiply each of the I, P, T components by the gain). However, a filtered gain value can be used instead so as to avoid or inhibit changes in gain which are too rapid (and so avoid generating subjectively disturbing artefacts when the images are displayed).

filtered_gain=alpha*gain+(1−alpha)*prev_filtered_gain prev_filtered_gain is a preceding instance or value of the filtered gain where alpha=3*(gain−prev_filt_gain)*(gain−prev_filt_gain)

alpha may also be limited to a maximum (e.g. 0.5)

The derivation of this gain equation will now be discussed. Generally an HDR image would be expected to have a slightly higher mean brightness than an SDR image, and though this depends on the nature of the image and the director's original intention, it could be undesirable just to increase the gain of all SDR images when converting to HDR.

One option is to increase the gain of bright images on the assumption that they have been exposed to fill the SDR range but not to increase the gain of darker scenes so much as they are likely to have been (or at least it is possible that they have been) exposed for artistic effect rather than system limitations.

To address this, another option for deriving a gain value is to base the gain adjustment on the amount of pixels at the high end of the histogram with an equation:

Gain=1.2+10*hist(80:100)/hist(1:100)

This can potentially be improved by also taking into account the low end of the histogram, the reasoning being that images with higher contrast (which is to say, more dark and more light areas) would benefit from a higher gain. An example equation is therefore:

Gain=1+13*hist(80,100)/hist(1,100)*(1+0.6*(10*(hist(1:15)/hist(1:100))−1)

This equation has been chosen empirically by using the IPT-based limiting algorithm to provide source images and comparing the unlimiter output images with the original HDR images. It has also been tested empirically with a range of Rec.709 originated images. The maximum gain is limited to 2.2 to allow enough headroom for image highlights—note that gain is applied in IPT space so this is equivalent to a maximum gain of approximately 6 in linear (RGB) space. This is appropriate for 1000 cd/m2 but could be increased if brighter displays are targeted.

As discussed above, when the brightness of an image is changed then it can also be appropriate to adjust the gamma for the best (or a better) subjective effect. The gamma is therefore adjusted according to the gain, from 1.0 to 1.15. Note that this mirrors the gamma adjustment in the IPT-based limiting algorithm.

FIGS. 28 and 29 therefore provide an example in which the mapping circuitry is configured to apply a gain factor in dependence upon a distribution of pixel brightness amongst pixels of the input image. For example the mapping circuitry is configured to filter the gain factor so as to reduce changes in the scaling factor applicable to successive input images.

Figure 30:
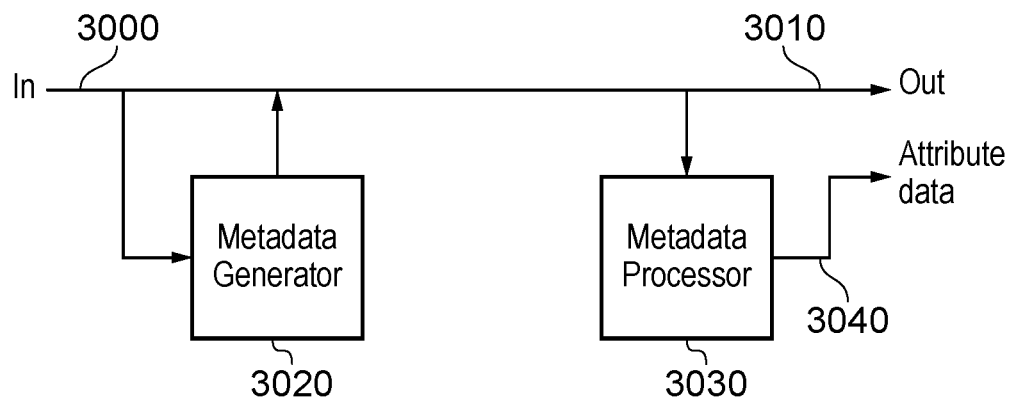
FIG. 30 schematically illustrates a metadata assisted transmission or storage channel.

FIG. 30 schematically illustrates a metadata assisted transmission or storage channel. Here, an input image or video signal 3000 is to be transmitted to an output 3010. At the input side, a metadata generator 3020 detects one or more attributes of the input signal 3000 relevant to the processors discussed here and generates metadata indicative of those attributes. At the output side, a metadata processor 3030 detects and retrieves the metadata and provides attribute data 3040 to be used along with the output image or video signal.

Figure 31:
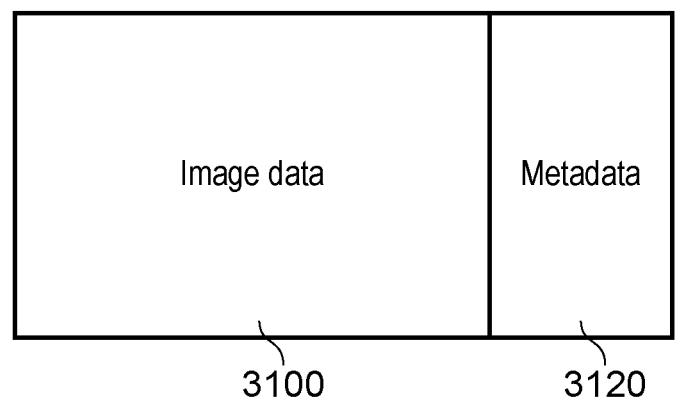
FIG. 31 schematically illustrates an image with associated metadata.

FIG. 31 schematically illustrates image data 3100 associated with such metadata 3120.

For example, the pixel distribution discussed with reference to FIGS. 26 to 29 could be detected (once) at a broadcast head end or transmitter side and metadata indicating the pixel distribution transmitted along with the image or video signal. This means that at a receiver side, there is no need to provide an instance of the distribution detector 2930; instead, the distribution indicated by the metadata could be used. Similarly, the entire processing leading up to a filtered gain value could be carried out once at a transmitter side and the filtered gain value transmitted as metadata to be used (without the need to regenerate the filter gain value) at each receiver). In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

In the examples given above, the gamma function of the images can be changed as the gain is changed so that brighter images have a higher gamma, so gamma may be reduced in the HDR→SDR conversion and increased in SDR→HDR conversion.

Figure 32:
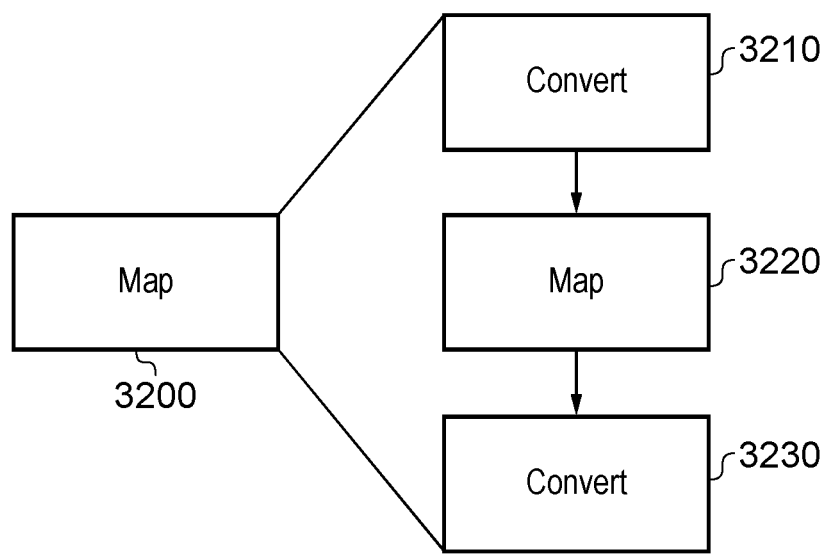
FIGS. 32 and 33 schematically illustrate respective methods.

FIG. 32 schematically illustrates a colour conversion method comprising:

mapping (at a step 3200) pixels of an input image having colour components in an input colour space to pixels of a mapped image having colour components in an output colour space, the input colour space and the output colour space being different colour spaces such that at least a subset of colours representable in the input colour space are not representable in the output colour space.

The mapping step 3200 may comprise:

converting (at a step 3210) pixels from the input colour space to an intermediate colour space in which a colour space representation of hue approximates to a consistent perceived hue independent of brightness and/or saturation;

mapping (at a step 3220) pixels in the intermediate colour space which lie outside a region of the intermediate colour space corresponding to representable colours in the output colour space to generate mapped pixels, so that the mapped pixels lie within that region, by varying the brightness and/or saturation of those pixels but leaving the hue of those pixels substantially unchanged; and converting (at a step 3230) the mapped pixels from the intermediate colour space to the output colour space.

Figure 33:
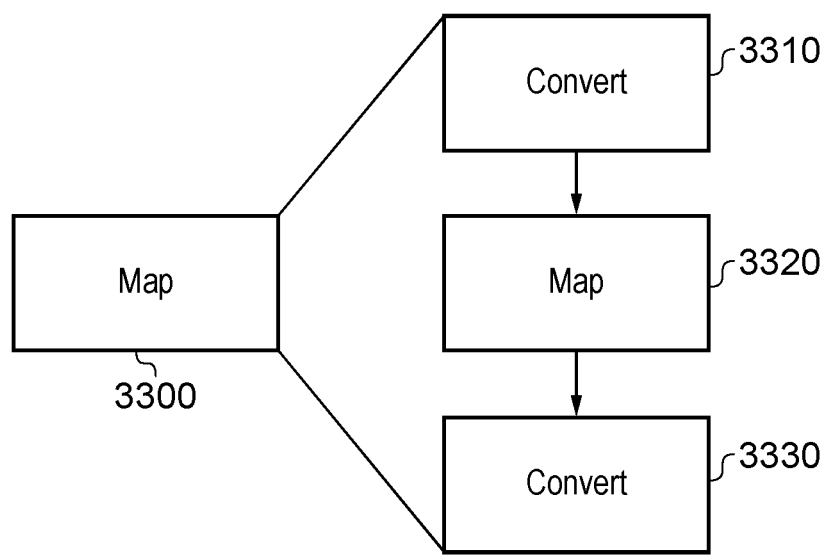

FIG. 33 schematically illustrates a colour conversion method comprising:

mapping (at a step 3300) pixels of an input image having colour components in an input colour space to pixels of an mapped image having colour components in an output colour space, the input colour space and the output colour space being different colour spaces such that at least a subset of colours representable in the output colour space are not representable in the input colour space.

The mapping step may comprise:

converting (at a step 3310) pixels from the input colour space to an intermediate colour space in which a colour space representation of hue approximates to a consistent perceived hue independent of brightness and/or saturation;

mapping (at a step 3320) at least some pixels in the intermediate colour space to mapped pixels which lie outside a first region of the intermediate colour space corresponding to representable colours in the input colour space but which are within a second region of the intermediate colour space corresponding to representable colours in the output colour space, by varying the brightness and/or saturation of those pixels but leaving the hue of those pixels substantially unchanged; and converting (at a step 3330) pixels from the intermediate colour space to the output colour space.

An example of an intermediate colour space in which a colour space representation of hue approximates to a consistent perceived hue independent of brightness and/or saturation is the so-called IPT colour space. This is described (as an example reference) in Ebner; Fairchild (1998), Development and Testing of a Color Space with Improved Hue Uniformity, Proc. IS&T 6th Color Imaging Conference, Scottsdale, Ariz., pp. 8-13, the contents of which are incorporated herein by reference. Another example is the so-called $IC_TC_P$ colour space. This is described (as an example reference) in https://www.dolby.com/us/en/technologies/dolby-vision/ictcp-white-paper.pdf, the contents of which are incorporated herein by reference.

It will be apparent that numerous modifications and variations of the present disclosure are possible in light of the above teachings. It is therefore to be understood that within the scope of the appended claims, the technology may be practiced otherwise than as specifically described herein.

Respective embodiments are defined by the following numbered clauses:

1. Colour conversion apparatus comprising:

mapping circuitry configured to map pixels of an input image having colour components in an input colour space to pixels of an mapped image having colour components in an output colour space, the input colour space and the output colour space being different colour spaces such that at least a subset of colours representable in the input colour space are not representable in the output colour space;

the mapping circuitry being configured to:

convert pixels from the input colour space to an intermediate colour space in which a colour space representation of hue approximates to a consistent perceived hue independent of brightness and/or saturation;

map pixels in the intermediate colour space which lie outside a region of the intermediate colour space corresponding to representable colours in the output colour space to generate mapped pixels so that the mapped pixels lie within that region, by varying the brightness and/or saturation of those pixels in the intermediate colour space but leaving the hue of those pixels substantially unchanged; and convert the mapped pixels from the intermediate colour space to the output colour space.

2. Apparatus according to clause 1, in which the mapping circuitry is configured to map a pixel, at a pixel position in a range of pixel positions in the intermediate colour space including a predetermined boundary portion of the region of the intermediate colour space, to a mapped pixel at a pixel position in the range of pixel positions having a lower brightness and saturation.

3. Apparatus according to clause 1 or clause 2, in which the mapping circuitry is configured to apply a scaling of brightness and saturation in the intermediate colour space, which scaling maintains a ratio of brightness to saturation, to pixels outside the region of the intermediate colour space corresponding to representable colours in the output colour space.

4. Apparatus according to clause 3, in which the mapping circuitry is configured to vary the saturation of any pixels which cannot be mapped, by the scaling of brightness and saturation in the intermediate colour space, to lie within the region of the intermediate colour space corresponding to representable colours in the output colour space, the variation of the saturation being such that pixels subject to the variation can be mapped, by the scaling of brightness and saturation in the intermediate colour space, to lie within the region of the intermediate colour space corresponding to representable colours in the output colour space.

5. Apparatus according to clause 3 or clause 4, in which the mapping circuitry is configured to reduce the saturation of at least some of the pixels by an amount dependent upon the brightness of those pixels.

6. Apparatus according to clause 5, in which the mapping circuitry is configured to reduce the saturation of pixels having at least a threshold brightness.

7. Apparatus according to clause 6, in which the threshold brightness corresponds to a maximum brightness representable in the output colour space.

8. Apparatus according to any one of clauses 5 to 7, in which the amount, by which the saturation is reduced, increases with increasing pixel brightness.

9. Apparatus according to any one of the preceding clauses, in which the mapping circuitry is configured to:

apply a gain to the pixels in dependence upon a gain factor; and generate the gain factor in dependence upon a distribution of pixel values of the pixels.

10. Apparatus according to clause 9, in which the mapping circuitry is configured to generate the gain factor so that no more than a predetermined proportion of pixels in the input image, if scaled according to the gain factor, would have colours not representable in the output colour space.

11. Apparatus according to clause 9 or clause 10, in which the mapping circuitry is configured to filter the gain factor so as to reduce changes in the scaling factor applicable to successive input images.

12. Apparatus according to any one of the preceding clauses, in which the intermediate colour space is an IPT colour space.

13. Image capture processing, storage, display or transmission apparatus comprising apparatus according to according to any one of the preceding clauses.

14. A colour conversion method comprising:

mapping pixels of an input image having colour components in an input colour space to pixels of an mapped image having colour components in an output colour space, the input colour space and the output colour space being different colour spaces such that at least a subset of colours representable in the input colour space are not representable in the output colour space;

the mapping step comprising:

converting pixels from the input colour space to an intermediate colour space in which a colour space representation of hue approximates to a consistent perceived hue independent of brightness and/or saturation;

mapping pixels in the intermediate colour space which lie outside a region of the intermediate colour space corresponding to representable colours in the output colour space to generate mapped pixels, so that the mapped pixels lie within that region, by varying the brightness and/or saturation of those pixels but leaving the hue of those pixels substantially unchanged; and converting the mapped pixels from the intermediate colour space to the output colour space.

15. Computer software which, when executed by a computer, causes the computer to carry out the method of clause 14.

16. A non-transitory machine-readable storage medium which stores computer software according to clause 15.

17. Colour conversion apparatus comprising:

mapping circuitry configured to map pixels of an input image having colour components in an input colour space to pixels of an mapped image having colour components in an output colour space, the input colour space and the output colour space being different colour spaces such that at least a subset of colours representable in the output colour space are not representable in the input colour space;

the mapping circuitry being configured to:

convert pixels from the input colour space to an intermediate colour space in which a colour space representation of hue approximates to a consistent perceived hue independent of brightness and/or saturation;

map at least some pixels in the intermediate colour space to mapped pixels which lie outside a first region of the intermediate colour space corresponding to representable colours in the input colour space but which are within a second region of the intermediate colour space corresponding to representable colours in the output colour space, by varying the brightness and/or saturation of those pixels but leaving the hue of those pixels substantially unchanged; and convert pixels from the intermediate colour space to the output colour space.

18. Apparatus according to clause 17, in which the mapping circuitry is configured to map a pixel in a predetermined boundary portion of the region of the intermediate colour space to a mapped pixel at a pixel position in a range of pixel positions in the intermediate colour space including the predetermined boundary portion and having a greater brightness and saturation.

19. Apparatus according to clause 17 or clause 18, in which the mapping circuitry is configured to apply a scaling of brightness and saturation in the intermediate colour space, which scaling maintains a ratio of brightness to saturation, to generate pixels corresponding to representable colours in the output colour space.

20. Apparatus according to clause 19, in which the mapping circuitry is configured to increase at least the saturation of at least some pixels mapped to mapped pixels outside a region in the intermediate colour space corresponding to colours representable in the input colour space.

21. Apparatus according to clause 19 or clause 20, in which the mapping circuitry is configured to increase the saturation of at least some of the mapped pixels by an amount dependent upon the brightness of those mapped pixels.

22. Apparatus according to clause 21, in which the mapping circuitry is configured to increase the saturation of mapped pixels having at least a threshold brightness.

23. Apparatus according to clause 22, in which the threshold brightness corresponds to a maximum brightness representable in the input colour space.

24. Apparatus according to any one of clauses 21 to 23, in which the amount, by which the saturation is increased, increases with increasing pixel brightness.

25. Apparatus according to any one of clauses 17 to 24, in which the mapping circuitry is configured to apply a gain factor in dependence upon a distribution of pixel brightness amongst pixels of the input image.

26. Apparatus according to clause 25, in which the mapping circuitry is configured to filter the gain factor so as to reduce changes in the scaling factor applicable to successive input images.

27. Apparatus according to any one of clauses 17 to 26, in which the intermediate colour space is an IPT colour space.

28. Image capture processing, storage, display or transmission apparatus comprising apparatus according to any one of clauses 17 to 27.

29. A colour conversion method comprising:

mapping pixels of an input image having colour components in an input colour space to pixels of an mapped image having colour components in an output colour space, the input colour space and the output colour space being different colour spaces such that at least a subset of colours representable in the output colour space are not representable in the input colour space;

the mapping step comprising:

converting pixels from the input colour space to an intermediate colour space in which a colour space representation of hue approximates to a consistent perceived hue independent of brightness and/or saturation;

mapping at least some pixels in the intermediate colour space to mapped pixels which lie outside a first region of the intermediate colour space corresponding to representable colours in the input colour space but which are within a second region of the intermediate colour space corresponding to representable colours in the output colour space, by varying the brightness and/or saturation of those pixels but leaving the hue of those pixels substantially unchanged; and converting pixels from the intermediate colour space to the output colour space.

30. Computer software which, when executed by a computer, causes the computer to carry out the method of clause 29.

31. A non-transitory machine-readable storage medium which stores computer software according to clause 30.

The invention claimed is:

1. A color conversion apparatus comprising:

mapping circuitry configured to map pixels of an input image having color components in an input color space to pixels of an mapped image having color components in an output color space, the input color space and the output color space being different color spaces such that at least a subset of colors representable in the input color space are not representable in the output color space;

the mapping circuitry being configured to:

convert pixels from the input color space to an intermediate color space in which a color space representation of hue approximates to a consistent perceived hue independent of brightness and/or saturation;

map pixels in the intermediate color space which lie outside a region of the intermediate color space corresponding to representable colors in the output color space to generate mapped pixels so that the mapped pixels lie within that region, by varying the brightness and/or saturation of those pixels in the intermediate color space but leaving the hue of those pixels substantially unchanged; and convert the mapped pixels from the intermediate color space to the output color space.

2. The apparatus according to claim 1, wherein the mapping circuitry is configured to map a pixel, at a pixel position in a range of pixel positions in the intermediate color space including a predetermined boundary portion of the region of the intermediate color space, to a mapped pixel at a pixel position in the range of pixel positions having a lower brightness and saturation.

3. The apparatus according to claim 1, wherein the mapping circuitry is configured to apply a scaling of brightness and saturation in the intermediate color space, which scaling maintains a ratio of brightness to saturation, to pixels outside the region of the intermediate color space corresponding to representable colors in the output color space.

4. The apparatus according to claim 3, wherein the mapping circuitry is configured to vary the saturation of any pixels which cannot be mapped, by the scaling of brightness and saturation in the intermediate color space, to lie within the region of the intermediate color space corresponding to representable colors in the output color space, the variation of the saturation being such that pixels subject to the variation can be mapped, by the scaling of brightness and saturation in the intermediate color space, to lie within the region of the intermediate color space corresponding to representable colors in the output color space.

5. The apparatus according to claim 3, wherein the mapping circuitry is configured to reduce the saturation of at least some of the pixels by an amount dependent upon the brightness of those pixels.

6. The apparatus according to claim 5, wherein the mapping circuitry is configured to reduce the saturation of pixels having at least a threshold brightness.

7. The apparatus according to claim 6, wherein the threshold brightness corresponds to a maximum brightness representable in the output color space.

8. The apparatus according to claim 5, wherein the amount, by which the saturation is reduced, increases with increasing pixel brightness.

9. The apparatus according to claim 1, wherein the mapping circuitry is configured to:
apply a gain to the pixels in dependence upon a gain factor; and
generate the gain factor in dependence upon a distribution of pixel values of the pixels.

10. The apparatus according to claim 9, wherein the mapping circuitry is configured to generate the gain factor so that no more than a predetermined proportion of pixels in the input image, if scaled according to the gain factor, would have colors not representable in the output color space.

11. The apparatus according to claim 9, wherein the mapping circuitry is configured to filter the gain factor so as to reduce changes in the scaling factor applicable to successive input images.

12. The apparatus according to claim 1,
wherein the intermediate color space is an IPT color space.

13. An image capture processing, storage, display or transmission apparatus comprising apparatus according to claim 1.

14. A color conversion method comprising:
mapping pixels of an input image having color components in an input color space to pixels of an mapped image having color components in an output color space, the input color space and the output color space being different color spaces such that at least a subset of colors representable in the input color space are not representable in the output color space;
the mapping step comprising:
converting pixels from the input color space to an intermediate color space in which a color space representation of hue approximates to a consistent perceived hue independent of brightness and/or saturation;
mapping pixels in the intermediate color space which lie outside a region of the intermediate colour space corresponding to representable colors in the output color space to generate mapped pixels, so that the mapped pixels lie within that region, by varying the brightness and/or saturation of those pixels but leaving the hue of those pixels substantially unchanged; and
converting the mapped pixels from the intermediate color space to the output color space.

15. A non-transitory computer-readable medium encoded with computer-readable instructions that, when executed by a computer, cause the computer to perform the method of claim 14.

16. A color conversion apparatus comprising:
mapping circuitry configured to map pixels of an input image having color components in an input color space to pixels of an mapped image having color components in an output color space, the input color space and the output color space being different color spaces such that at least a subset of colors representable in the output color space are not representable in the input color space;
the mapping circuitry being configured to:
convert pixels from the input color space to an intermediate color space in which a color space representation of hue approximates to a consistent perceived hue independent of brightness and/or saturation;
map at least some pixels in the intermediate color space to mapped pixels which lie outside a first region of the intermediate color space corresponding to representable colors in the input color space but which are within a second region of the intermediate color space corresponding to representable color in the output color space, by varying the brightness and/or saturation of those pixels but leaving the hue of those pixels substantially unchanged; and
convert pixels from the intermediate color space to the output color space.

17. The apparatus according to claim 16, wherein the mapping circuitry is configured to map a pixel in a predetermined boundary portion of the region of the intermediate color space to a mapped pixel at a pixel position in a range of pixel positions in the intermediate color space including the predetermined boundary portion and having a greater brightness and saturation.

18. The apparatus according to claim 16, wherein the mapping circuitry is configured to apply a scaling of brightness and saturation in the intermediate color space, which scaling maintains a ratio of brightness to saturation, to generate pixels corresponding to representable colors in the output color space.

19. The apparatus according to claim 18, wherein the mapping circuitry is configured to increase at least the saturation of at least some pixels mapped to mapped pixels outside a region in the intermediate color space corresponding to colors representable in the input color space.

* * * * *